US 11,451,817 B2

United States Patent
Lim et al.

(10) Patent No.: US 11,451,817 B2
(45) Date of Patent: *Sep. 20, 2022

(54) METHOD OF PERFORMING MOTION VECTOR PREDICTION, AND APPARATUS THEREOF

(71) Applicant: Sun Patent Trust, New York, NY (US)

(72) Inventors: Chong Soon Lim, Singapore (SG); Sue Mon Thet Naing, San Jose, CA (US); Takahiro Nishi, Nara (JP); Hisao Sasai, Osaka (JP); Youji Shibahara, Osaka (JP); Toshiyasu Sugio, Osaka (JP); Kyoko Tanikawa, Osaka (JP); Toru Matsunobu, Osaka (JP); Kengo Terada, Osaka (JP)

(73) Assignee: SUN PATENT TRUST, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/215,492

(22) Filed: Mar. 29, 2021

(65) Prior Publication Data
US 2021/0218981 A1 Jul. 15, 2021

Related U.S. Application Data

(63) Continuation of application No. 16/890,404, filed on Jun. 2, 2020, now Pat. No. 10,992,949, which is a
(Continued)

(51) Int. Cl.
*H04N 7/12* (2006.01)
*H04N 19/513* (2014.01)
(Continued)

(52) U.S. Cl.
CPC ......... *H04N 19/513* (2014.11); *H04N 19/103* (2014.11); *H04N 19/176* (2014.11);
(Continued)

(58) Field of Classification Search
CPC .. H04N 19/513; H04N 19/103; H04N 19/176; H04N 19/44; H04N 19/52; H04N 19/70; H04N 19/61
(Continued)

(56) References Cited

U.S. PATENT DOCUMENTS 8,711,940 B2  4/2014  Lin
8,824,558 B2  9/2014  Lin
(Continued)

FOREIGN PATENT DOCUMENTS

EP  2 773 111  9/2014
EP  2 773 112  9/2014
(Continued)

OTHER PUBLICATIONS

International Search Report dated Aug. 13, 2013 in International (PCT) Application No. PCT/JP2013/002932.
(Continued)

*Primary Examiner* — Gims S Philippe
(74) *Attorney, Agent, or Firm* — Wenderoth, Lind & Ponack, L.L.P.

(57) ABSTRACT

A method of performing motion vector prediction for a current block in a picture is provided which includes: deriving a candidate for a motion vector predictor to code a current motion vector of the current block, from a first motion vector of a first block that is spatially adjacent or temporally adjacent to the current block; adding the derived candidate to a list of candidates; and deriving at least one motion vector predictor based on a selected candidate from the list of candidates, wherein the deriving of the candidate includes determining whether to derive the candidate from the first motion vector, based on a type of a current reference picture and a type of a first reference picture, the current reference picture being referred to from the current block (Continued)

using the current motion vector, the first reference picture being referred to from the first block using the first motion vector.

3 Claims, 39 Drawing Sheets

Related U.S. Application Data continuation of application No. 16/433,363, filed on Jun. 6, 2019, now Pat. No. 10,715,826, which is a continuation of application No. 16/007,484, filed on Jun. 13, 2018, now Pat. No. 10,368,085, which is a continuation of application No. 15/182,013, filed on Jun. 14, 2016, now Pat. No. 10,027,973, which is a continuation of application No. 14/049,289, filed on Oct. 9, 2013, now Pat. No. 9,414,061, which is a continuation of application No. PCT/JP2013/002932, filed on May 7, 2013.

(60) Provisional application No. 61/644,511, filed on May 9, 2012.

(51) Int. Cl.
  *H04N 19/176* (2014.01)
  *H04N 19/103* (2014.01)
  *H04N 19/52* (2014.01)
  *H04N 19/70* (2014.01)
  *H04N 19/44* (2014.01)
  *H04N 19/61* (2014.01)

(52) U.S. Cl.
  CPC ............. *H04N 19/44* (2014.11); *H04N 19/52* (2014.11); *H04N 19/70* (2014.11); *H04N 19/61* (2014.11)

(58) Field of Classification Search
  USPC .................................................... 375/240.16
  See application file for complete search history.

(56) References Cited

U.S. PATENT DOCUMENTS

| | | | |
|---|---|---|---|
| 8,861,606 B2 | 10/2014 | Wahadaniah et al. | |
| 8,913,665 B2 | 12/2014 | Wahadaniah et al. | |
| 9,473,789 B2 | 10/2016 | Oh | |
| 9,723,322 B2 | 8/2017 | Sugio | |
| 2009/0010323 A1 | 1/2009 | Su et al. | |
| 2009/0028249 A1 | 1/2009 | Gomila et al. | |
| 2009/0052529 A1 | 2/2009 | Kim et al. | |
| 2009/0141814 A1 | 6/2009 | Yin et al. | |
| 2009/0168874 A1 | 7/2009 | Su et al. | |
| 2012/0128060 A1* | 5/2012 | Lin | H04N 19/577 375/240.02 |
| 2012/0263231 A1 | 10/2012 | Zhou | |
| 2012/0300846 A1* | 11/2012 | Sugio | H04N 19/577 375/240.16 |
| 2013/0003850 A1* | 1/2013 | Sugio | H04N 19/147 375/240.16 |
| 2013/0107963 A1* | 5/2013 | Wahadaniah | H04N 19/52 375/240.16 |
| 2013/0107965 A1* | 5/2013 | Wahadaniah | H04N 19/52 375/240.16 |
| 2013/0114723 A1 | 5/2013 | Bici et al. | |
| 2013/0114742 A1 | 5/2013 | Hannuksela et al. | |
| 2013/0242048 A1 | 9/2013 | Yin et al. | |
| 2013/0301728 A1 | 11/2013 | Wahadaniah | |
| 2013/0315571 A1 | 11/2013 | Park | |
| 2014/0205014 A1 | 7/2014 | Nakamura | |
| 2014/0341289 A1 | 11/2014 | Schwarz | |
| 2014/0341291 A1 | 11/2014 | Schwarz | |
| 2014/0348245 A1 | 11/2014 | Wahadaniah et al. | |
| 2016/0191942 A1 | 6/2016 | Oh | |
| 2016/0241867 A1 | 8/2016 | Sugio | |

FOREIGN PATENT DOCUMENTS

| | | |
|---|---|---|
| EP | 2 782 341 | 9/2014 |
| EP | 2 826 247 | 1/2015 |
| JP | 2009-522986 | 6/2009 |
| WO | 2007/081926 | 7/2007 |

OTHER PUBLICATIONS

A Written Opinion of the International Searching Authority dated Aug. 13, 2013 in International (PCT) Application No. PCT/JP2013/002932 (in English).
ISO/IEC 14496-10, "MPEG-4 Part 10 Advanced Video Coding," Oct. 1, 2004.
Benjamin Bross et al., "High efficiency video coding (HEVC) text specification draft 6", Joint Collaborative Team on Video Coding (JCT-VC) of ITU-T SG16 WP3 and ISO/IEC JTC1/SC29/WG11 JCTVC-H1003(JCTVC-H1003_dK.doc), ITU-T, Apr. 2, 2012, p. 98,123-124.
Jill Boyce et al., "High layer syntax to improve support for temporal scalability", Joint Collaborative Team on Video Coding (JCT-VC) of ITU-T SG16 WP3 and ISO/IEC JTC1/SC29/WG11 JCTVC-D200(JCTVC-D200.doc), ITU-T, Jan. 22, 2011, p. 1-14.
Yusuke Itani et al., "Improvement to AMVP/Merge Process", Joint Collaborative Team on Video Coding (JCT-VC) of ITU-T SG16 WP3 and ISO/IEC JTC1/SC29/WG11 JCTVC-E064, ITU-T, Mar. 23, 2011, pp. 1-8.
Chong Soon Lim et al., "High-Level Syntax: MVP Scaling Issue for LTRPs", Joint Collaborative Team on Video Coding (JCT-VC) of ITU-T SG16 WP3 and ISO/IEC JTC1/SC29/WG11 JCTVC-I0422, ITU-T, May 7, 2012, pp. 1-3.
European Search Report dated Mar. 30, 2015 in corresponding European patent application No. 13787534.0.
Chong Soon Lim et al.: "Joint Collaborative Team on Video Coding (JCT-VC) of ITU-T SG 16 WP 3 and ISO/IEC JTC 1:High-level Syntax: MVP scaling issue for LTRPs", Apr. 28, 2012 (Apr. 28, 2012), XP055177532, Retrieved from the Internet: URL:http://phenix.int-evry.fr/jct/doc_end_user/current_document.php?id-5680 [retrieved on Mar. 18, 2015].
Yoshitomo Takahashi et al.: "Descriptions of 3D Video Coding Proposal (HEVC-Compatible Category) by Sony", 98. Mpeg Meeting; Nov. 28, 2011-Feb. 12, 2011; Geneva; (Motion Picture Expert Group or ISO/IEC JTC1/SC29/WG11),,No. m22566, Nov. 22, 2011 (Nov. 22, 2011), XP030051129.
Office Action dated May 29, 2017 in corresponding European Application No. 13787534.0.
Extended European Search Report dated Dec. 7, 2020 in corresponding European Patent Application No. 20192555.9.
Chen Y. et al., "Hooks for temporal motion vector prediction and weighted prediction in HEVC multiview/3DV extension", JCT-VC 9th Meeting, May 2012, pp. 1-7.

* cited by examiner

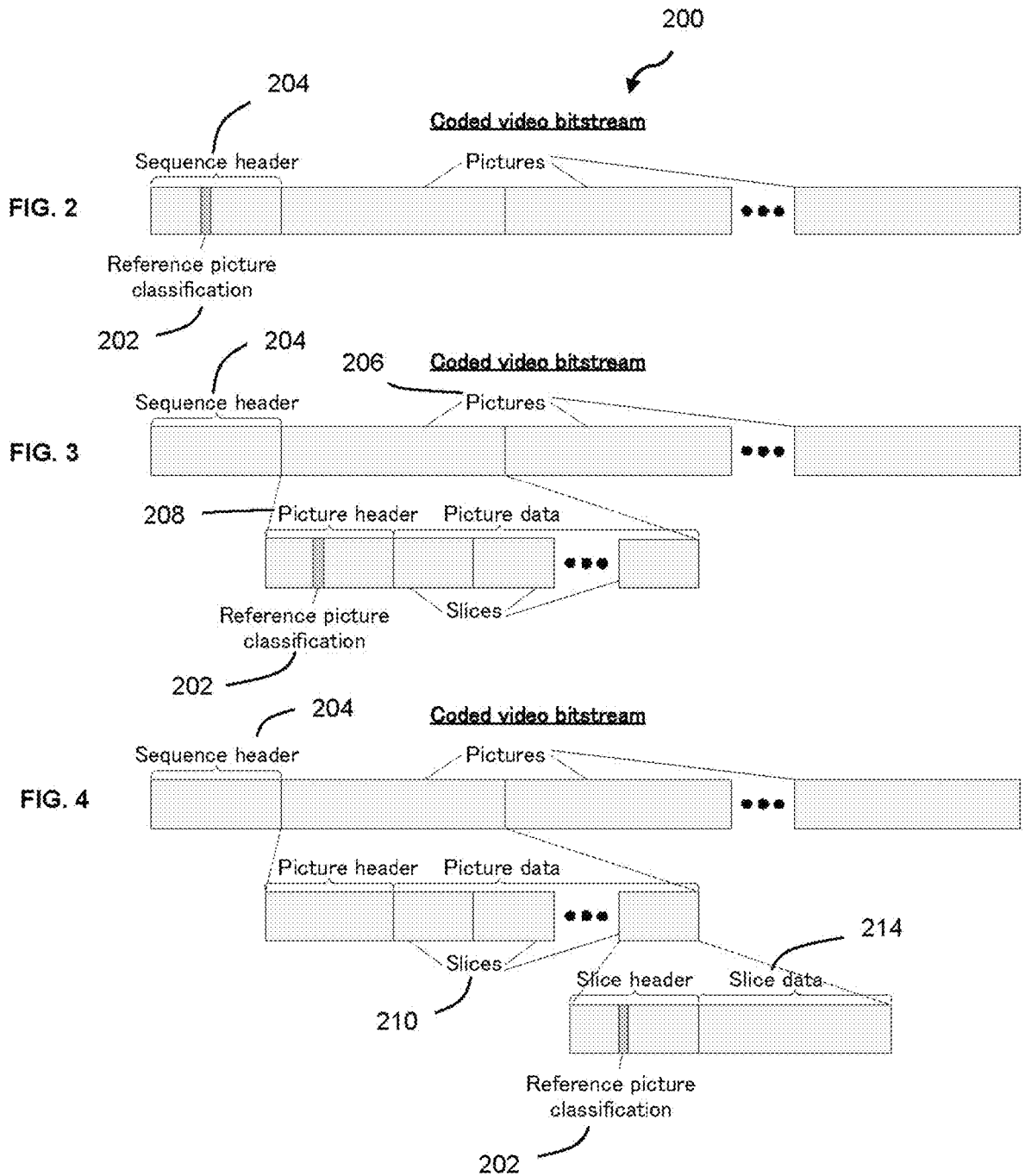

| |
|---|
| Video stream (PID=0x1011, Primary video) |
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00, Secondary video) |
| Video stream (PID=0x1B01, Secondary video) |

FIG. 29

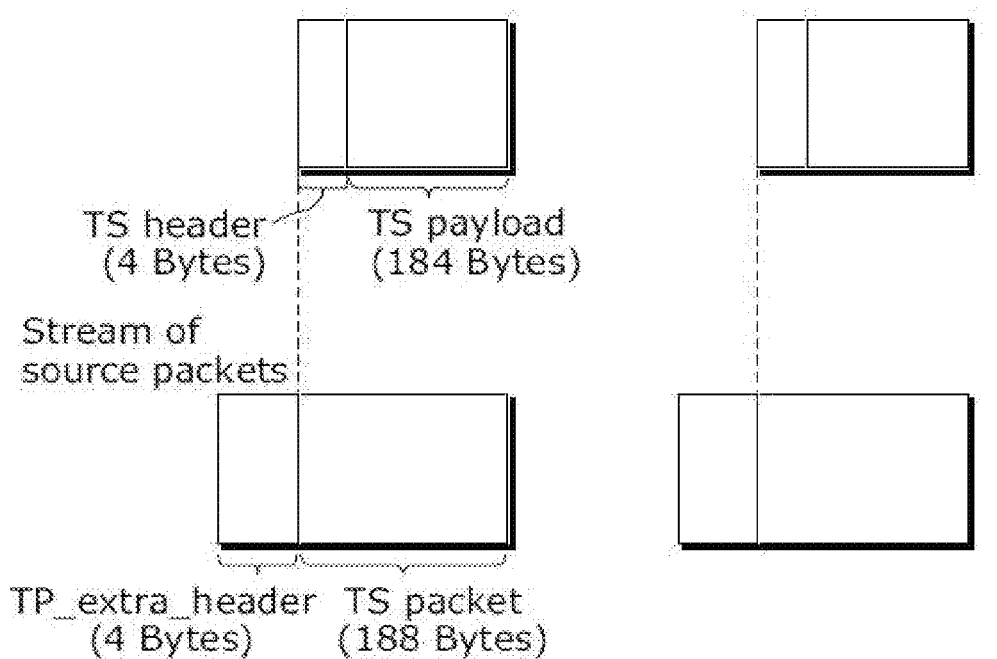
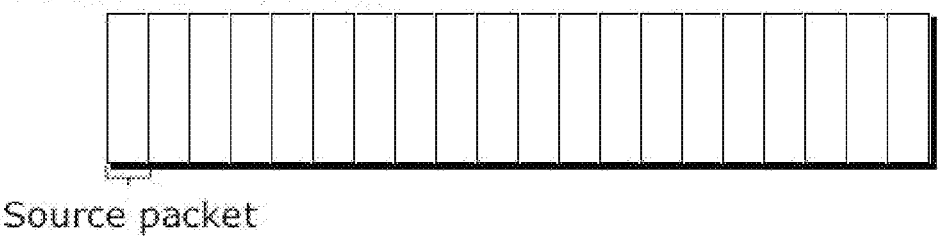
FIG. 32

| Corresponding standard | Driving frequency |
|---|---|
| MPEG-4 AVC | 500 MHz |
| MPEG-2 | 350 MHz |
| ⋮ | ⋮ |

FIG. 40

METHOD OF PERFORMING MOTION VECTOR PREDICTION, AND APPARATUS THEREOF

CROSS REFERENCE TO RELATED APPLICATIONS

This is a continuation of application Ser. No. 16/890,404, filed Jun. 2, 2020, which is a continuation of application Ser. No. 16/433,363, filed Jun. 6, 2019, now U.S. Pat. No. 10,715,826, which is a continuation of application Ser. No. 16/007,484, filed Jun. 13, 2018, now U.S. Pat. No. 10,368,085, which is a continuation of application Ser. No. 15/182,013, filed Jun. 14, 2016, now U.S. Pat. No. 10,027,973, which is a continuation of application Ser. No. 14/049,289, filed Oct. 9, 2013, now U.S. Pat. No. 9,414,061, which is a continuation application of PCT International Application No. PCT/JP2013/002932 filed on May 7, 2013, designating the United States of America, which is based on and claims priority of U.S. Patent Application No. 61/644,511 filed on May 9, 2012. The entire disclosures of the above-identified applications, including the specifications, drawings and claims are incorporated herein by reference in their entirety.

FIELD

One or more exemplary embodiments disclosed herein relate to a method of performing motion vector prediction, an encoding method and a decoding method involving the motion vector prediction, and encoding and decoding apparatuses thereof. These embodiments can be applied in any multimedia data coding and, more particularly, in video (or image) coding that supports different types of reference pictures for the motion vector prediction process.

BACKGROUND

Recent video coding schemes such as HEVC (High Efficiency Video Coding), MVC (Multiview Video Coding) or SVC (Scalable Video Coding) support inter-picture prediction using previously coded reference pictures. The classification of reference pictures may be different depending on, e.g., their Picture Order Count (POC) distance from a target picture, view layer for SVC and view id for 3D video and MVC. Nevertheless, conventional coding scheme applies the same motion vector prediction for all types of reference pictures regardless of their view id, view layers and whether they are short or long term reference pictures. For example, performing POC-based scaling on a motion vector (MV) which points to a long term reference picture (LTRP) may result in the scaled motion vector having an extremely large or small magnitude. In such a case, the accuracy and efficiency of the motion vector prediction process becomes suboptimal.

HEVC supports spatial motion vector prediction and temporal motion vector prediction. In spatial motion vector prediction, the motion vector of a target prediction unit (PU) is predicted using a motion vector of a previously coded neighbouring PU. Both the target PU and the neighbouring PU are located within a current target picture. In temporal motion vector prediction, a motion vector of a target prediction unit (PU) is predicted using a motion vector of a collocated block. The collocated block is located within a previously coded collocated picture and the collocated block is coded using a motion vector pointing to a reference picture (which may be referred to as a collocated reference picture). The term collocated generally indicates that the coordinates of the collocated PU within the collocated picture are the same as the coordinates of the target PU within the current target picture. However, due to variable coding unit and prediction unit sizes in HEVC, the current PU and collocated PU may not be perfectly aligned (i.e. their coordinates may not be exactly the same), and a predetermined selection scheme is used for selecting the collocated PU.

A motion vector predictor (MVP) may be obtained by scaling the motion vector of a neighbouring PU or a collocated PU based on certain characteristics of the motion vector such as its temporal distance (i.e., picture order count (POC) value difference) between the target picture and its corresponding reference picture. For example, the motion vector of a collocated PU may be scaled according to the POC distance to produce a temporal MVP for the current PU according to the following equation:

$$MVP=(tb/td)*nmv$$

where:
MVP=temporal motion vector predictor derived from the motion vector of collocated block/PU;
nmv=motion vector of the collocated block/PU;
tb=signed POC distance/difference from the current picture to the reference picture referred by the target block/PU;
td=signed POC distance/difference from the collocated picture to the reference picture referred by the collocated block/PU.

Generally, in spatial prediction, for deriving "td", the target picture is the current picture and its reference picture is the collocated reference picture. In temporal prediction, for deriving "tb", the target picture is the collocated picture and its reference picture is the collocated reference picture. For deriving "tb", target picture is the current picture and its reference picture is the current reference (i.e., referred by the target PU, either from RefList0 or RefList1) for both spatial and temporal prediction.

CITATION LIST

Non Patent Literature

[NPL 1]
ISO/IEC 14496-10, "MPEG-4 Part 10 Advanced Video Coding"

SUMMARY

Technical Problem

As described in the background, conventional coding scheme applies the same motion vector prediction for all types of reference pictures, that is, scaling is perform without consideration of the type of reference pictures involved. For example, conventional POC-based scaling scheme does not consider whether the reference pictures involved in the motion vector prediction are long term reference pictures. Performing POC-based scaling on a motion vector which points to a long term reference picture may result in the scaled motion vector (i.e., MVP) having an erroneous extremely large or small magnitude. This is because the POC distance between a long term reference picture (LTRP) and a PU which refers to the LTRP may be large. In such a case, the accuracy and efficiency of motion vector prediction process becomes inaccurate and suboptimal.

Solution to Problem

In one general aspect, the techniques disclosed here feature a method of performing motion vector prediction for a current block in a picture, the method comprising:

deriving a candidate for a motion vector predictor to code a current motion vector of the current block, from a first motion vector of a first block that is spatially adjacent or temporally adjacent to the current block;

adding the derived candidate to a list of candidates; and deriving at least one motion vector predictor based on a selected candidate from the list of candidates, wherein the deriving of the candidate includes determining whether to derive the candidate from the first motion vector, based on a type of a current reference picture and a type of a first reference picture, the current reference picture being referred to from the current block using the current motion vector, and the first reference picture being referred to from the first block using the first motion vector.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

Embodiments disclosed herein seek to improve encoding/decoding efficiency due to more accurate motion vector prediction. The complexity of motion vector prediction process is also reduced as unnecessary or undesirable scaling steps are removed.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 2 depicts a diagram illustrating an exemplary location of the reference picture classification parameter in the coded video bitstream according to one exemplary embodiment.

FIG. 3 depicts a diagram illustrating an exemplary location of the reference picture classification parameter in the coded video bitstream according to one exemplary embodiment.

FIG. 4 depicts a diagram illustrating an exemplary location of the reference picture classification parameter in the coded video bitstream according to one exemplary embodiment.

FIG. 29 illustrates a structure of multiplexed data.

FIG. 32 shows a structure of TS packets and source packets in the multiplexed data.

FIG. 40 shows an example of a look-up table in which video data standards are associated with driving frequencies.

DESCRIPTION OF EMBODIMENTS

Figure 1:
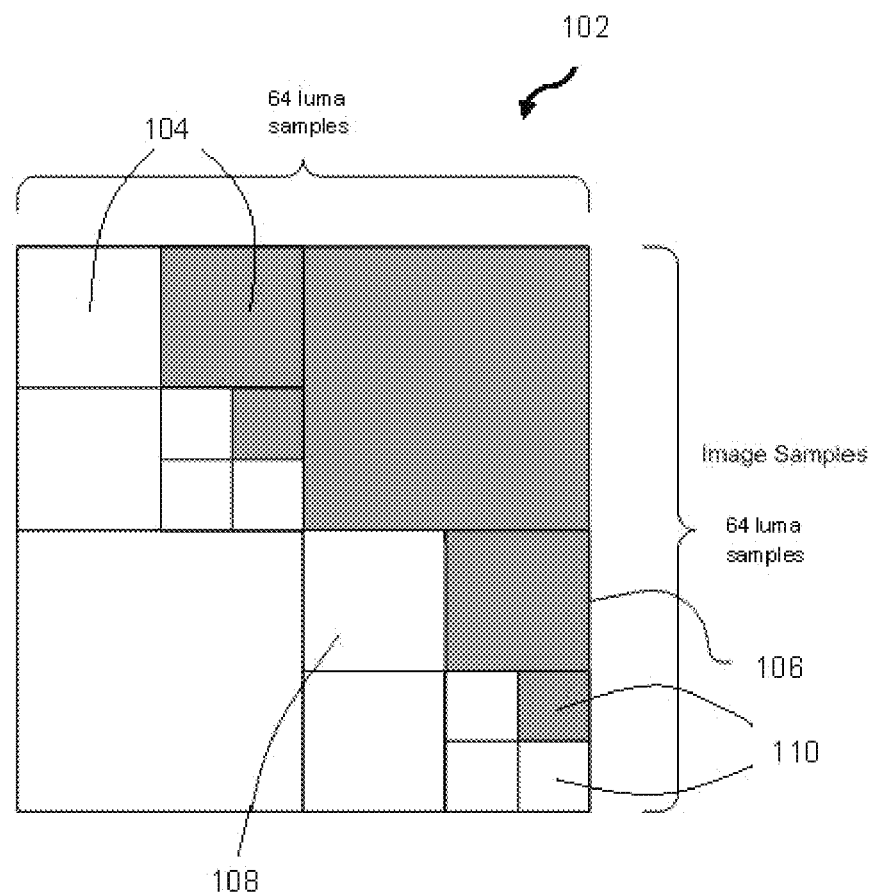
FIG. 1 depicts an exemplary largest coding unit (LCU).

Embodiments disclosed herein seek to provide methods and apparatuses for performing motion vector prediction with consideration of the type of the reference pictures involved. In particular, according to an embodiment disclosed herein, whether to scale the motion vector for producing a motion vector predictor candidate and/or whether to include the motion vector in a candidate list of motion vector predictor candidates, is decided based on the type of the reference pictures involved. Therefore, the efficiency of the motion vector prediction process can be improved since unnecessary or undesirable scaling steps (i.e., scaling which results in an erroneous motion vector predictor being produced) are reduced or removed.

According to an embodiment, in spatial motion vector prediction, POC-based motion vector scaling is disabled when any one of the following conditions is true:
current (i.e., target) PU refers to a predetermined type of reference picture, or
neighbouring PU refers to a predetermined type of reference picture.

According to another embodiment, in temporal motion vector prediction, POC-based motion vector scaling is disabled when any one of the following conditions is true:
current (i.e., target) PU refers to a predetermined type of reference picture, or
collocated PU refers to a predetermined type of reference picture.

For example, the predetermined type of reference picture may be a long term reference picture. In an embodiment, when POC-based motion vector scaling is disabled, the neighbouring or collocated PU's motion vector is taken directly as the spatial or temporal motion vector predictor when available motion vector candidate for the spatial or temporal motion vector prediction is needed.

In certain embodiments, depending on the type of reference pictures involved, the spatial or temporal motion vector candidate may be directly set as being not available (i.e., excluded from the candidate list).

In one general aspect, the techniques disclosed here feature a method of performing motion vector prediction for a current block in a picture, the method comprising:
deriving a motion vector predictor candidate for a candidate list of motion vector predictor candidates for the current block having a current motion vector and a current reference picture, and
deriving a motion vector predictor based on a selected motion vector predictor candidate from the candidate list,
wherein said deriving the motion vector predictor candidate comprises:
selecting a motion vector of a neighbouring block or a collocated block of the current block, said motion vector having an associated reference picture, and
deciding whether to scale said motion vector to produce the motion vector predictor candidate, and/or whether to include said motion vector in the candidate list, based on a type of the current reference picture and/or a type of said associated reference picture.

For example, said deciding comprises determining whether the current reference picture or said associated reference picture is of a predetermined type.

The method may further comprise excluding said motion vector from for inclusion in the candidate list if the current reference picture or said associated reference picture is of the predetermined type.

The method may further comprise scaling said motion vector to produce the motion vector predictor candidate if the current reference picture or said associated reference picture is of the predetermined type.

If the current reference picture or said associated reference picture is of the predetermined type, the method may decide not to scale said motion vector, and duplicate said motion vector to produce the motion vector predictor candidate.

The method may further comprise scaling said motion vector to produce the motion vector predictor candidate if the current reference picture and said associated reference picture is of the same type.

For example, the predetermined type of reference picture is a long term reference picture, an inter-view reference picture, and/or an inter-layer reference picture.

According to another aspect of the techniques disclosed herein, there is provided an encoding method for encoding a current block of a picture to generate an encoded bitstream, the encoding method comprises the method of performing motion vector prediction for the current block according to the general aspect of the disclosed techniques described hereinbefore.

According to another aspect of the techniques disclosed herein, there is provided a decoding method for decoding a current block of a picture from an encoded bitstream, the decoding method comprises the method of performing motion vector prediction for the current block according to the general aspect of the disclosed techniques described hereinbefore.

According to another aspect of the techniques disclosed herein, there is provided an encoding apparatus for encoding a current block in a picture to generate an encoded bitstream, the encoding apparatus comprising:
a motion vector prediction unit for deriving a motion vector predictor candidate for a candidate list of motion vector predictor candidates for the current block having a current motion vector and a current reference picture, and for deriving a motion vector predictor based on a selected motion vector predictor candidate from the candidate list;

a control unit for receiving a motion vector of a neighbouring block or a collocated block of the current block, said motion vector having an associated reference picture, and for deciding whether to scale said motion vector to produce the motion vector predictor candidate, and/or whether to include said motion vector in the candidate list, based on a type of the current reference picture and/or a type of said associated reference picture;

an inter prediction unit for producing a predicted block based on the derived motion vector predictor; and an encoding unit for generating the encoded bitstream based on the current block and the predictive block, wherein the control unit is configured to output a signal indicative of said decision to the motion vector prediction unit for deriving the motion vector predictor candidate based on the signal.

According to another aspect of the techniques disclosed herein, there is provided a decoding apparatus for decoding a current block in a picture from an encoded bitstream, the decoding apparatus comprising:

a motion vector prediction unit for deriving a motion vector predictor candidate for a candidate list of motion vector predictor candidates for the current block having a current motion vector and a current reference picture, and for deriving a motion vector predictor based on a selected motion vector predictor candidate from the candidate list;

a control unit for receiving a motion vector of a neighbouring block or a collocated block of the current block, said motion vector having an associated reference picture, and for deciding whether to scale said motion vector to produce the motion vector predictor candidate, and/or whether to include said motion vector in the candidate list, based on a type of the current reference picture and/or a type of said associated reference picture;

a decoding unit for decoding the current block from the encoded bit-stream; and an inter prediction unit for producing a predictive block based on the derived motion vector predictor, the predictive block for use in reconstructing the current block, wherein the control unit is configured to output a signal indicative of said decision to the motion vector prediction unit for deriving the motion vector predictor candidate based on the signal.

According to another aspect of the techniques disclosed herein, there is provided a computer program product, embodied in a non-transitory computer-readable storage medium, comprising instructions executable by a computing processor to perform the method according to the general aspect of the disclosed techniques described hereinbefore.

According to an exemplary embodiment disclosed herein, a method of performing motion vector prediction for a current block in a picture, comprises:

deriving a candidate for a motion vector predictor to code a current motion vector of the current block, from a first motion vector of a first block that is spatially adjacent or temporally adjacent to the current block;

adding the derived candidate to a list of candidates; and deriving at least one motion vector predictor based on a selected candidate from the list of candidates, wherein the deriving of the candidate includes determining whether to derive the candidate from the first motion vector, based on a type of a current reference picture and a type of a first reference picture, the current reference picture being referred to from the current block using the current motion vector, and the first reference picture being referred to from the first block using the first motion vector.

For example, the determining includes determining whether each of the current reference picture and the first reference picture is of a predetermined type.

For example, in the deriving of the candidate, the candidate is derived from the first motion vector when the current reference picture and the first reference picture are of a same type, and the candidate is not derived from the first motion vector when the current reference picture and the first reference pictures are of different types.

For example, the deriving of the candidate further includes scaling the first motion vector to produce the candidate when both the current reference picture and the first reference picture are not of the predetermined type.

For example, in the deriving of the candidate, duplicating the first motion vector to produce the candidate when both the current reference picture and the first reference picture are of the predetermined type.

For example, the predetermined type of each of the current reference picture and the first reference picture is one of a long term reference picture, an inter-view reference picture, and an inter-layer reference picture.

According to an exemplary embodiment disclosed herein, the above method further comprises encoding the current block into the encoded bitstream using the at least one motion vector predictor.

According to an exemplary embodiment disclosed herein, the above method further comprises decoding the current block to generate a reconstructed picture using the at least one motion vector predictor.

According to an exemplary embodiment disclosed herein, an apparatus for performing motion vector prediction for a current block in a picture, the apparatus comprises a motion vector prediction unit configured to:

derive a candidate for a motion vector predictor to code a current motion vector of the current block, from a first motion vector of a first block that is spatially adjacent or temporally adjacent to the current block;

add the derived candidate to a list of candidates; and derive at least one motion vector predictor based on a selected candidate from the list of candidates, wherein when the candidate is derived, whether to derive the candidate from the first motion vector is determined based on a type of a current reference picture and a type of a first reference picture, the current reference picture being referred to from the current block using the current motion vector, and the first reference picture being referred to from the first block using the first motion vector.

According to an exemplary embodiment disclosed herein, the above apparatus further comprises an encoding unit configured to encode the current block into the encoded bitstream using the at least one motion vector predictor.

According to an exemplary embodiment disclosed herein, the above apparatus further comprises a decoding unit configured to decode the current block to generate a reconstructed picture using the at least one motion vector predictor.

According to an exemplary embodiment disclosed herein, a non-transitory computer-readable storage medium comprises instructions for causing one or more processors to perform the above method.

According to an exemplary embodiment disclosed herein, an encoding apparatus for encoding a current block in a picture to generate an encoded bitstream comprises:

one or more processors; and storage coupled to the one or more processors, wherein the one or more processors are configured to:
derive a candidate for a motion vector predictor to code a current motion vector of the current block, from a first motion vector of a first block that is spatially adjacent or temporally adjacent to the current block;
add the derived candidate to a list of candidates;
derive at least one motion vector predictor based on a selected candidate from the list of candidates; and
encode the current block into the encoded bitstream using the at least one motion vector predictor,
wherein the deriving of the candidate includes determining whether to derive the candidate from the first motion vector, based on a type of a current reference picture and a type of a first reference picture, the current reference picture being referred to from the current block using the current motion vector, and the first reference picture being referred to from the first block using the first motion vector.

According to an exemplary embodiment disclosed herein, a decoding apparatus for decoding a current block in a picture from an encoded bitstream comprises:
one or more processors; and
storage coupled to the one or more processors,
wherein the one or more processors are configured to:
derive a candidate for a motion vector predictor to code a current motion vector of the current block, from a first motion vector of a first block that is spatially adjacent or temporally adjacent to the current block;
add the derived candidate to a list of candidates;
derive at least one motion vector predictor based on a selected candidate from the list of candidates; and
decode the current block to generate a reconstructed picture using the at least one motion vector predictor,
wherein the deriving of the candidate includes determining whether to derive the candidate from the first motion vector, based on a type of a current reference picture and a type of a first reference picture, the current reference picture being referred to from the current block using the current motion vector, and the first reference picture being referred to from the first block using the first motion vector.

According to an exemplary embodiment disclosed herein, a content transmitting method comprises
transmitting a bitstream from a device to a terminal in response to an instruction from the terminal, the bitstream being generated by performing an encoding process on a current block in a picture,
wherein the encoding process includes:
deriving a candidate for a motion vector predictor to code a current motion vector of the current block, from a first motion vector of a first block that is spatially adjacent or temporally-adjacent to the current block;
adding the derived candidate to a list of candidates;
deriving at least one motion vector predictor based on a selected candidate from the list of candidates; and
encoding the current block into the encoded bitstream using the at least one motion vector predictor,
wherein the deriving of the candidate includes determining whether to derive the candidate from the first motion vector, based on a type of a current reference picture and a type of a first reference picture, the current reference picture being referred to from the current block using the current motion vector, and the first reference picture being referred to from the first block using the first motion vector.

According to an exemplary embodiment disclosed herein, a method for managing content in a communication system comprises:
receiving a bitstream encoded by a encoding method from a first terminal;
storing the bitstream in a server;
receiving a request for the bitstream from a second terminal; and
transmitting the bitstream from the server to the second terminal,
wherein the encoding method includes:
deriving a candidate for a motion vector predictor to code a current motion vector of the current block, from a first motion vector of a first block that is spatially adjacent or temporally-adjacent to the current block;
adding the derived candidate to a list of candidates;
deriving at least one motion vector predictor based on a selected candidate from the list of candidates; and
encoding the current block into the encoded bitstream using the at least one motion vector predictor,
wherein the deriving of the candidate includes determining whether to derive the candidate from the first motion vector, based on a type of a current reference picture and a type of a first reference picture, the current reference picture being referred to from the current block using the current motion vector, and the first reference picture being referred to from the first block using the first motion vector.

According to an exemplary embodiment disclosed herein, a camera device for taking a picture and encoding a current block in the picture to generate an encoded bitstream comprises:
a camera unit configured to take the picture;
a motion vector prediction unit configured to
derive a candidate for a motion vector predictor to code a current motion vector of the current block, from a first motion vector of a first block that is spatially adjacent or temporally-adjacent to the current block,
add the derived candidate to a list of candidates, and
derive at least one motion vector predictor based on a selected candidate from the list of candidates,
an encoding unit configured to encode the current block into the encoded bitstream using the at least one motion vector predictor; and
a transmitting unit configured to transmit the encoded bitstream to an external device through a network,
wherein when the candidate is derived, whether to derive the candidate from the first motion vector is determined based on a type of a current reference picture and a type of a first reference picture, the current reference picture being referred to from the current block using the current motion vector, and the first reference picture being referred to from the first block using the first motion vector.

According to an exemplary embodiment disclosed herein, a terminal for decoding a current block in a picture from an encoded bitstream comprises:
a transmitting unit configured to transmit a request for the encoded bitstream to an external device;
a receiving unit configured to receive the encoded bitstream from the external device;
a motion vector prediction unit configured to
derive a candidate for a motion vector predictor to code a current motion vector of the current block, from a first motion vector of a first block that is spatially adjacent or temporally-adjacent to the current block,
add the derived candidate to a list of candidates, and
derive at least one motion vector predictor based on a selected candidate from the list of candidates;
a decoding unit configured to decode the current block to generate a reconstructed picture using the at least one motion vector predictor; and a display configured to display the reconstructed picture,
wherein when the candidate is derived, whether to derive the candidate from the first motion vector is determined based on a type of a current reference picture and a type of a first reference picture, the current reference picture being referred to from the current block using the current motion vector, and the first reference picture being referred to from the first block using the first motion vector.

Each of the exemplary embodiments described below shows a general or specific example. The numerical values, shapes, materials, structural elements, the arrangement and connection of the structural elements, steps, the processing order of the steps etc. shown in the following exemplary embodiments are mere examples, and therefore do not limit the scope of the appended Claims and their equivalents. Therefore, among the structural elements in the following exemplary embodiments, structural elements not recited in any one of the independent claims showing most generic concepts are described as arbitrary structural elements.

The latest video coding standards, e.g., High Efficiency Video Coding (HEVC), partitions an input picture into square blocks referred to as the largest coding units (LCUs). An exemplary LCU 102 is depicted in FIG. 1. The LCU 102 comprises coding units (CUs) 104 which may be coded as an intra predicted block (depicted as shaded blocks) 106 or an inter prediction block (depicted as unshaded blocks) 108. The CU 104 may further include one or more prediction units (PUs) 110, each PU 110 may be used to perform spatial prediction or temporal prediction. If the CU 104 is coded in intra mode, each PU 110 of the CU 104 can have its own spatial prediction direction. On the other hand, if the CU 104 is coded in inter mode, each PU 110 of the CU 104 can have its own motion vector(s) and associated reference picture(s).

In HEVC, motion vectors are predictively coded. For a current block (e.g., PU) 110 having a current motion vector and a current reference picture, a motion vector predictor (MVP) candidate for a candidate list (of MVP candidates) may be derived from a motion vector of a spatially neighbouring or temporally collocated block (e.g. PU) of the current block. The MVP candidate may be obtained by scaling the motion vector of a neighbouring PU or a collocated PU based on certain characteristics of the motion vector such as its temporal distance (POC value difference) between the target picture and its corresponding reference picture. For example, the motion vector of a neighbouring PU may be scaled according to the POC distance to produce a spatial MVP candidate for the current PU for inclusion in the candidate list. A suitable MVP for the current PU will then be selected from the candidate list according to a predetermined selection scheme known in the art.

As discussed in the background, the classification of reference pictures may be different depending on, e.g., their Picture Order Count (POC) distance from a target picture, view layer for SVC and view id for 3D video and MVC. Nevertheless, conventional coding scheme applies the same motion vector prediction for all types of reference pictures regardless of their view id, view layers and whether they are short or long term reference pictures. For example, performing POC-based scaling on a motion vector which points to a long term reference picture (LTRP) may result in the scaled motion vector having an extremely large or small magnitude. In such a case, the accuracy and efficiency of the motion vector prediction process become suboptimal.

Embodiments disclosed herein seek to provide methods and apparatuses for performing motion vector prediction with consideration of the type of the reference pictures involved. In particular, according to an embodiment disclosed herein, whether to scale the motion vector for producing a motion vector predictor candidate and/or whether to include the motion vector in a candidate list of motion vector predictor candidates, is decided based on the type of the reference pictures involved. Therefore, the efficiency of the motion vector prediction process can be improved since unnecessary or undesirable scaling steps (i.e., scaling which results in an erroneous motion vector predictor being produced) are reduced or removed.

FIGS. 2 to 4 depict diagrams illustrating exemplary locations of the reference picture classification parameter 202 in the coded video bitstream 200 according to embodiments disclosed herein. FIG. 2 shows the reference picture classification parameter 202 being located in a sequence header 204 of the coded video bitstream 200 according to an embodiment. The sequence header 204 is a header of the coded video bitstream 200 (e.g., a plurality of pictures 206). FIG. 3 shows the reference picture classification parameter 202 being located in a picture header 208 of a picture 206 in the coded video bitstream 200 according to another embodiment. The picture header 208 is the header of a picture 206 (e.g., a plurality of slices 210). FIG. 4 shows the reference picture classification parameter 202 being located in a slice header 212 of a slice 210 in the picture 206 according to yet another embodiment. The slice header 212 is the header of a slice 210.

Figure 5:
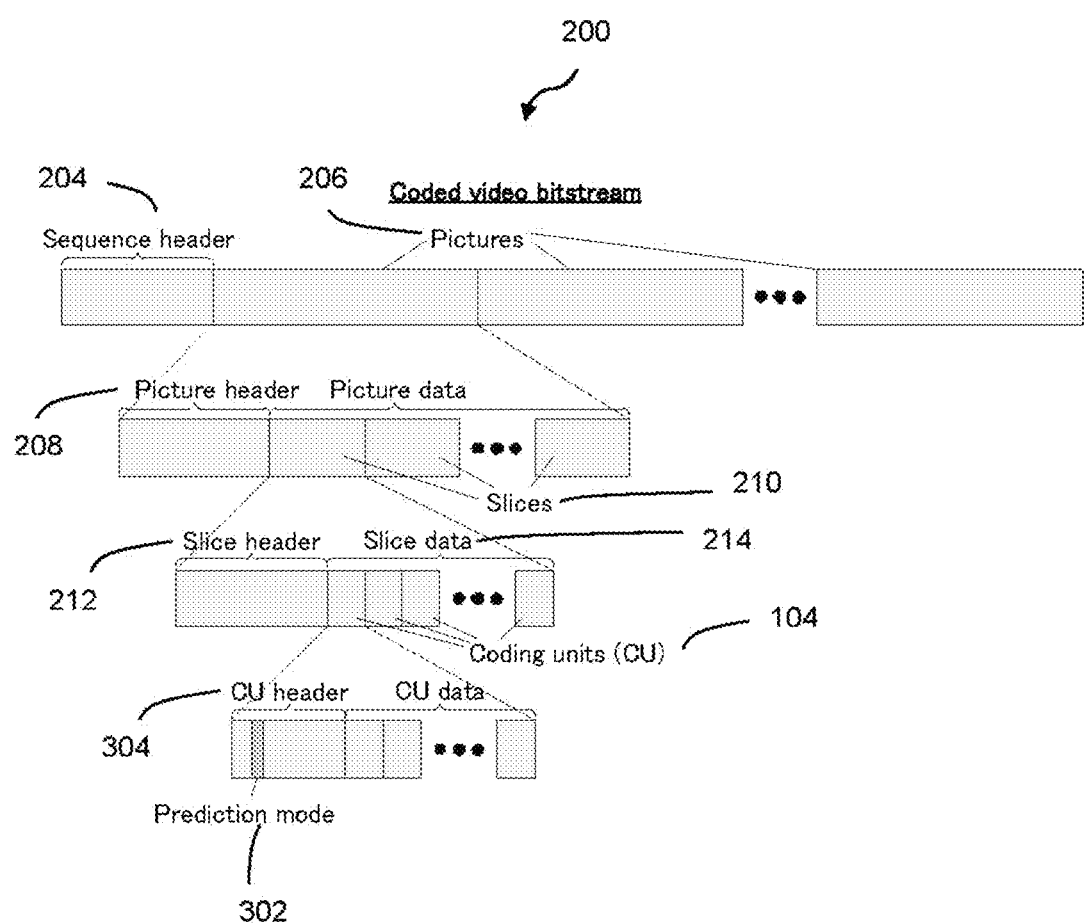
FIG. 5 depicts an exploded view diagram of the coded video bitstream illustrating an exemplary location of the prediction mode type parameter according to one exemplary embodiment.

FIG. 5 depicts an exploded view diagram of the coded video bitstream 200 showing an exemplary location of the prediction mode type parameter 302 according to an embodiment. The prediction mode type parameter 302 indicates the prediction mode (e.g., whether or not inter prediction mode is used) used to code the current block (e.g., the coding unit 104 or prediction unit 110). In this embodiment, the prediction mode type parameter 302 is located in a coding unit header 304 (i.e., the header of a coding unit 104). As illustrated in the exploded view diagram, each slice 210 comprises a slice header 212 and the associated slice data 214 which includes a plurality of coding units 104.

Figure 6:
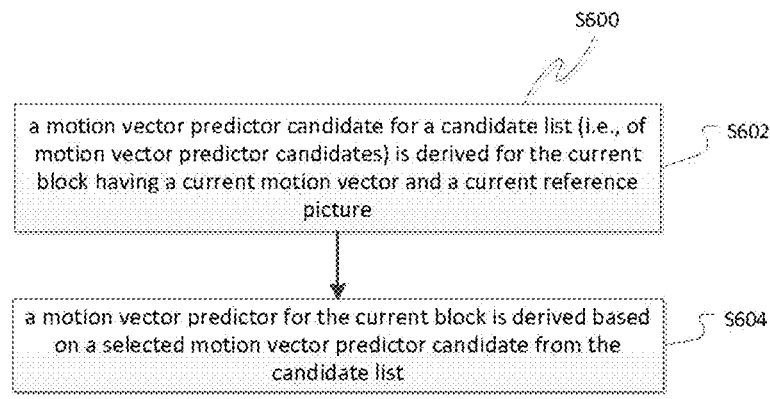
FIG. 6 depicts a flow diagram of a method of performing motion vector prediction for a current block in a picture according to one exemplary embodiment.
Figure 7:
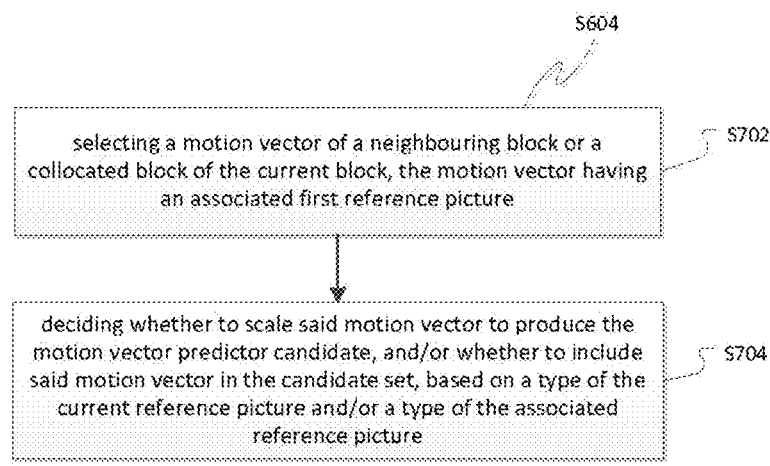
FIG. 7 depicts a flow diagram of a method of deriving a motion vector predictor candidate in the method of performing motion vector prediction according to one exemplary embodiment.

A method S600 of performing motion vector prediction for a current block of a picture will now be described according to an embodiment disclosed herein as illustrated in FIGS. 6 and 7. As a first step S602, a motion vector predictor candidate for a candidate list (i.e., of motion vector predictor candidates) is derived for the current block having a current motion vector and a current reference picture. Subsequently, in step S604, the motion vector predictor for the current block is derived based on a selected motion vector candidate from the candidate list. The above step S604 of deriving a motion vector predictor candidate includes a step S702 of selecting a motion vector of a neighbouring block or a collocated block of the current block, the motion vector having an associated reference picture, and a step S704 of deciding whether to scale said motion vector to produce the motion vector predictor candidate, and/or whether to include said motion vector in the candidate set, based on a type of the current reference picture and/or a type of the associated reference picture.

According to embodiments disclosed herein, there is provided an encoding method for encoding a current block of a picture to generate an encoded bitstream 200 and a decoding method for decoding a current block from the encoded bitstream 200 which include the method S400 of performing motion vector prediction for the current block. For clarity and illustration purposes, exemplary encoding and method methods will be described later below.

Accordingly, unnecessary or undesirable scaling steps which result in erroneous motion vector predictors being produced are reduced or removed, thereby improving the efficiency of the motion vector prediction process.

Figure 8:
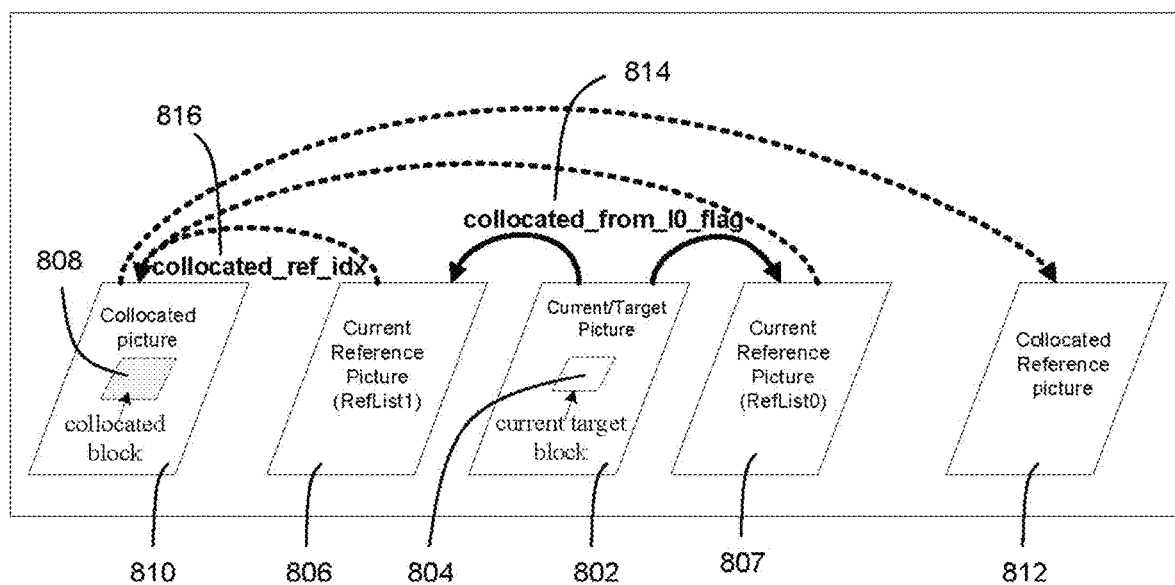
FIG. 8 depicts a general inter-relationship between various blocks and pictures in a temporal motion prediction.

FIG. 8 illustrates the general inter-relationship between the current block (e.g., PU) 804 in the current picture 802, the current reference picture 806 or 807, the collocated block 808 in the collocated picture 810 and the collocated reference picture 812. As illustrated in FIG. 8, the current or target block 804 has a current motion vector and an associated current reference picture 806 or 807. The current reference picture 806 or 807 refers to the reference picture which is referred to by the current block 802 for performing the inter prediction process. Whether the current reference picture is from RefList1 806 or RefList0 807 may be indicated by a flag (e.g., collocated_from_l0_flag) 814 associated with the current block 802. For example, RefList0 807 may be indicated by the flag 814 having a value "1" and RefList1 806 may be indicated by the flag 814 having a value of "0". In this example, the current motion vector 808 is predicted (i.e., a motion vector predictor is derived) based on a motion vector of a collocated block 808 of the current block 804. The motion vector of the collocated block 808 points to a reference picture 812 which may be referred to as the collocated reference picture.

From FIG. 8, example steps to derive a collocated reference picture 812 may be as described below.

As a first step, a reference picture list is selected (either RefList1 806 or RefList0 807) based on the flag 814 (e.g., collocated_from_l0_flag). For example, the flag 814 may be signalled from the slice header 212 or the slice type. The selected reference picture list includes one or more reference pictures with their respective reference indexes. For example, a signal (e.g., collocated_ref_idx) 816 is parsed from the same slice header 212 which specifies the reference index of the collocated picture 810 used for temporal motion vector prediction. Therefore, a collocated picture 810 may be determined based on the signal 816 indicating the reference index of the collocated picture 810. A collocated block 808 within the collocated picture 810 is selected/derived based on a predetermined selection technique known in the art and thus need not be described in detail herein. Information of the collocated reference picture 812 which includes the reference picture type and the collocated motion vector may then be retrieved from the collocated block 808.

For clarity and illustration purposes, exemplary methods of encoding and decoding video/image involving motion vector prediction will now be described in further details according to embodiments disclosed herein.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Hereinafter, certain exemplary embodiments are described in greater detail with reference to the accompanying Drawings.

Each of the exemplary embodiments described below shows a general or specific example. The numerical values, shapes, materials, structural elements, the arrangement and connection of the structural elements, steps, the processing order of the steps etc. shown in the following exemplary embodiments are mere examples, and therefore do not limit the scope of the appended Claims and their equivalents. Therefore, among the structural elements in the following exemplary embodiments, structural elements not recited in any one of the independent claims are described as arbitrary structural elements.

First Embodiment

Figure 9:
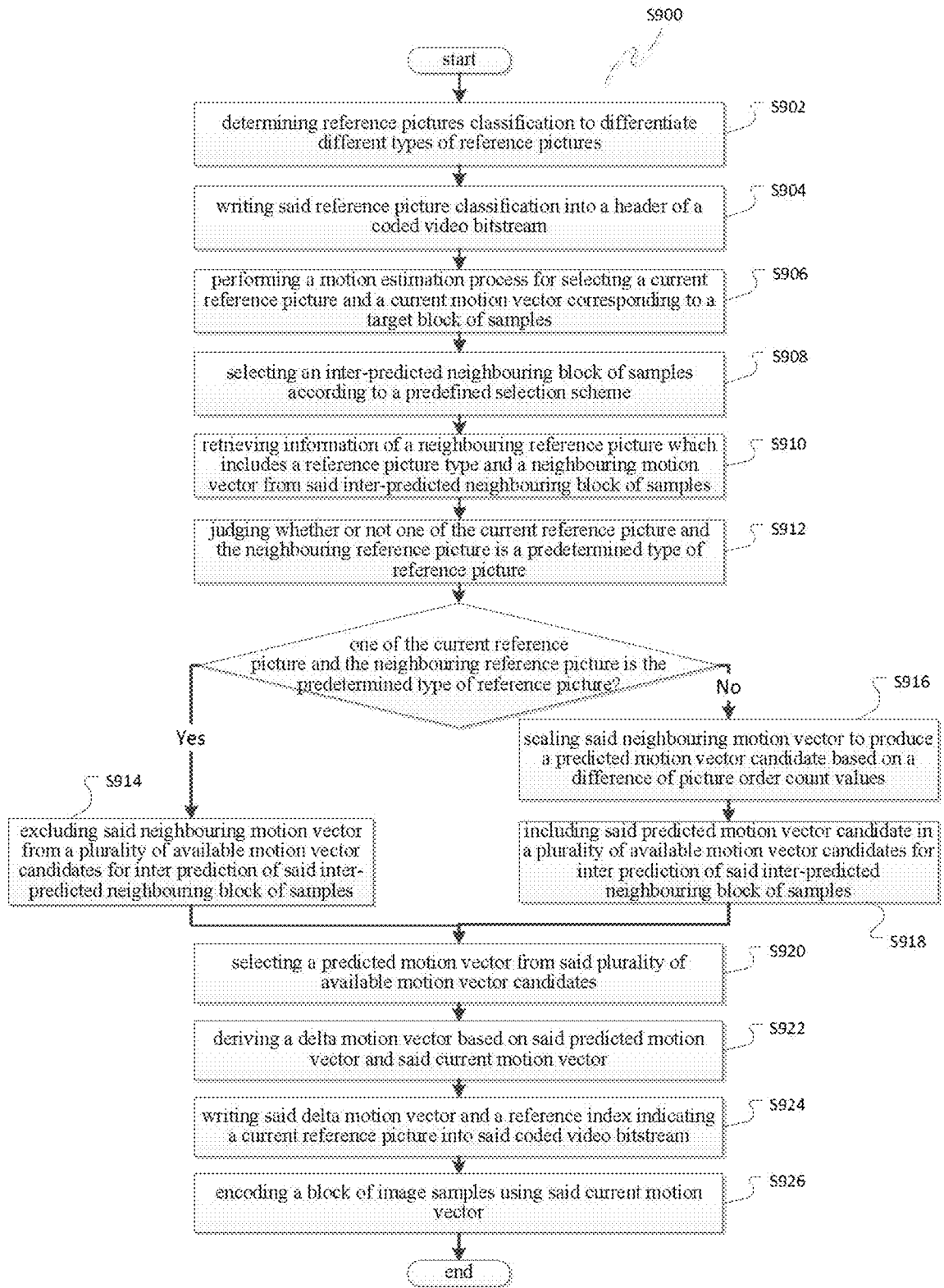
FIG. 9 depicts a flow diagram illustrating a method of encoding a video/image according to a first embodiment of the present disclosure.

FIG. 9 depicts a flowchart S900 illustrating the exemplary steps involved in encoding a video/image according to a first embodiment of the present disclosure.

As a first step S902, reference pictures classification is determined to differentiate or identify the types of reference pictures involved. Next at step S904, reference picture classification parameter(s) 202 is written into a header of the coded video bitstream 200. For example, as illustrated in FIG. 2, the reference picture classification parameter(s) can be located in a sequence header 204, a picture header 208, or a slice header 202. Motion estimation process is performed at step S906 for selecting a current reference picture and a current motion vector corresponding to a current or target block of samples. Then, at step S908, an inter-predicted neighbouring block of samples is selected according to a predefined selection scheme as known to a person skilled in the art and thus need not be described herein. The inter-predicted neighbouring block has a motion vector and an associated reference picture pointed to by the motion vector. For simplicity, the motion vector and reference picture of the neighbouring block and be referred to as neighbouring motion vector and neighbouring reference picture, respectively. At step S910, information relating to the neighbouring reference picture is retrieved from the neighbouring block, including its reference picture type and the neighbouring motion vector. At step S912, a decision/judgement is made whether or not one of the current reference picture and the neighbouring reference picture is a particular or predetermined type of reference picture.

In the first embodiment, if one of the current reference picture and the neighbouring reference picture is of the predetermined type of reference picture, at step S914, the neighbouring motion vector is excluded from a plurality of available motion vector candidates for inter prediction of the current block. That is, it is decided not to include the neighbouring motion vector in the candidate list of motion vector predictor candidates for the current block. Otherwise, if at least one of the current reference picture and the neighbouring reference picture is determined not to be of the predetermined type of reference picture, POC-based scaling is performed on the neighbouring motion vector to produce a MVP candidate at step S916 and the MVP candidate is included in the candidate list at step S918.

In a beneficial embodiment, at step S912, if both the current reference picture and the neighbouring reference picture have the same reference picture type (including the case when both the reference pictures are of the predetermined type of reference pictures), the method then proceeds to step S916. That is, POC-based scaling is performed on the neighbouring motion vector to produce a MVP candidate at step S916 and the MVP candidate is included in the candidate list at step S918.

At step S920, a MVP is selected from the plurality of available MVP candidates (i.e., candidate list). Based on the MVP and the current motion vector, a delta motion vector is derived at step S922. The derived delta motion vector and a reference index indicating the current reference picture are written into the coded video bitstream 200 at step S324. At step S926, the current block is encoded using the current motion vector.

For example, in the embodiments described herein, the predetermined type of reference picture may be a long term reference picture, an inter-view reference picture and/or an inter-layer reference picture. An example of an inter-view picture is a reference picture that exists across different views (e.g. 3D views). Examples of inter-layer reference pictures are reference pictures that exist across different quality layers (e.g. SNR scalability), different resolution layers (e.g. spatial scalability) and different layers coded using different video codecs (e.g. one layer coded using MPEG2/AVC and another layer coded using HEVC). Typically, coded video layers comprise a based layer and one or more enhancement layer/s.

Figure 10:
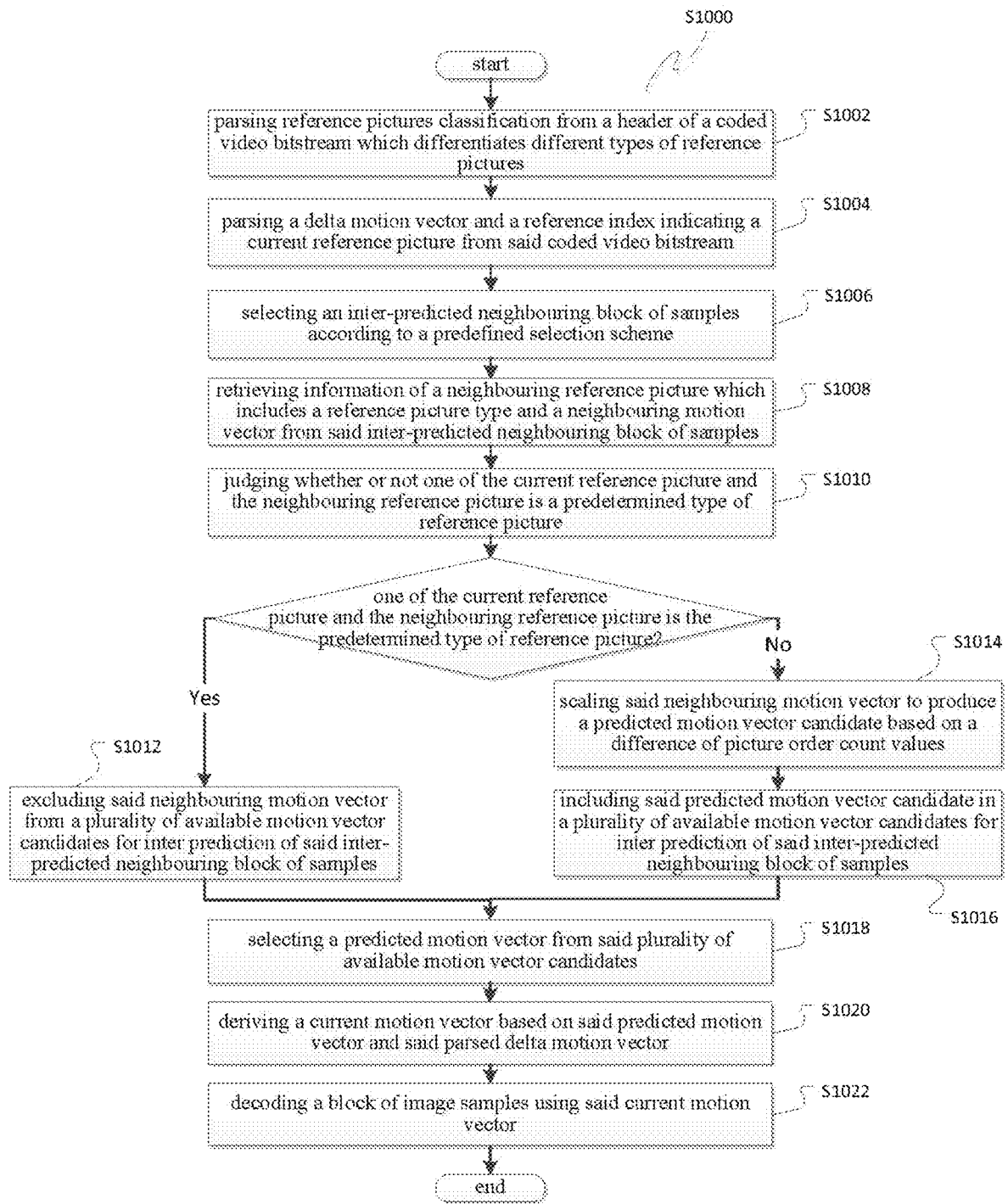
FIG. 10 depicts a flow diagram illustrating a method of decoding a coded video/image according to the first embodiment of the present disclosure.

FIG. 10 depicts a flowchart S1000 illustrating the exemplary steps involved in decoding a coded video/image according to the first embodiment of the present disclosure.

As a first step S1000, reference picture classification parameter(s) 202 is parsed from a header of the coded video bitstream which differentiates or identifies the type of the reference pictures. Next at step S1004, a delta motion vector and a reference index indicating a current reference picture (written into the coded video bitstream 200 at step S924 of the encoding method described hereinbefore) are parsed from the coded video bitstream 200. Then, at step S1006, an inter-predicted neighbouring block of samples is selected according to a predefined selection scheme as known to a person skilled in the art and thus need not be described herein. The inter-predicted neighbouring block has a motion vector and an associated reference picture pointed to by the motion vector. For simplicity, the motion vector and the reference picture of the neighbouring block can be referred to as neighbouring motion vector and neighbouring reference picture, respectively. At step S1008, information relating to the neighbouring reference picture is retrieved from the neighbouring block, including its reference picture type and the neighbouring motion vector. At step S1010, a decision/judgement is made whether or not one of the current reference picture and the neighbouring reference picture is a particular or predetermined type of reference pictures.

In the first embodiment, in the same manner as the encoding method described hereinbefore, if one of the current reference picture and the neighbouring reference picture is of the particular type of reference picture, at step S1012, the neighbouring motion vector is excluded from a plurality of available motion vector predictor candidates for inter prediction of the current block. That is, it is decided not to include the neighbouring motion vector in the candidate list of motion vector predictor candidates for the current block. Otherwise, if at least one of the current reference picture and the neighbouring reference picture is determined not to be of the predetermined type of reference picture, POC-based scaling is performed on the neighbouring motion vector to produce a motion vector predictor (MVP) candidate at step S1014 and the MVP candidate is included in the candidate list at step S1016.

In a beneficial embodiment, if both the current reference picture and the neighbouring reference picture have the same reference picture type (including the case when both the reference pictures are particular type of reference pictures), the method proceeds to step S1014. That is, POC-based scaling is performed on the neighbouring motion vector to produce a motion vector predictor (MVP) candidate at step S1014 and the MVP candidate is included in the candidate list at step S1016.

At step S1018, a predicted motion vector is selected from the plurality of available motion vector candidates (i.e., candidate list). At step 1020, a current motion vector is derived based on the predicted motion vector and the parsed delta motion vector. At step S1022, the current block is decoded using the current motion vector.

Second Embodiment

Figure 11:
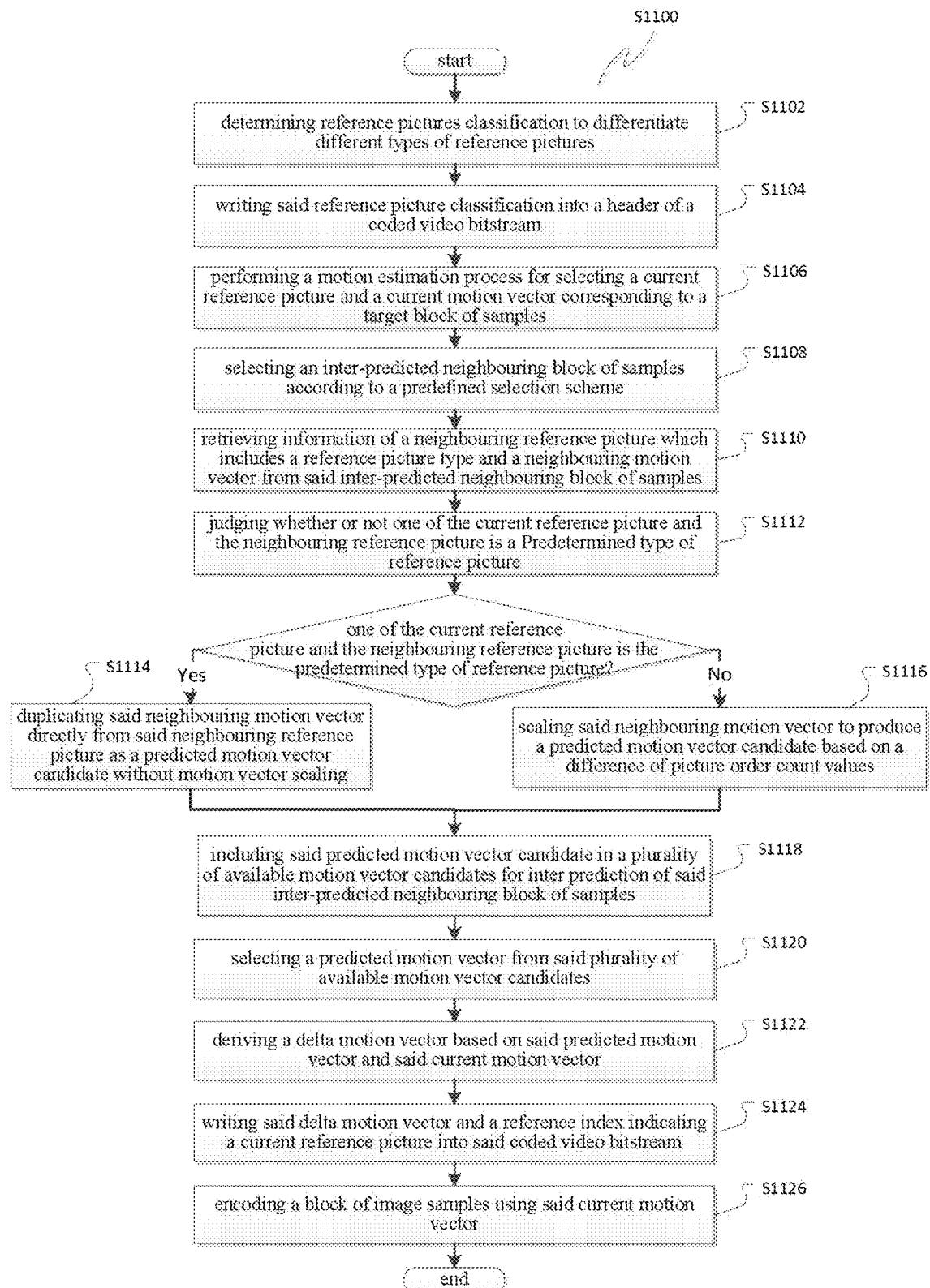
FIG. 11 depicts a flow diagram illustrating a method of encoding a video/image according to a second embodiment of the present disclosure.

FIG. 11 depicts a flowchart S1100 illustrating the exemplary steps involved in encoding a video/image according to a second embodiment of the present disclosure.

The encoding methods of the first and second embodiments are generally the same except in relation to steps S1114, S1116 and S1118. For clarity and to avoid unnecessary repetition, it is not necessary to describe steps of the second embodiment which are the same or similar as those of the first embodiment (i.e., S1102, S1104, S1106, S1108, S1110, S1112, S1120, S1122, S1124, and S1126).

In the second embodiment, if one of the current reference picture and the neighbouring reference picture is of the predetermined type of reference picture, at step 1114, the neighbouring motion vector is duplicated directly to produce the MVP candidate, i.e., without motion vector scaling. Otherwise, if at least one of the current reference picture and the neighbouring reference picture is determined not to be of the predetermined type of reference picture, POC-based scaling is performed on the neighbouring motion vector to produce the MVP candidate at step S1116. In the second embodiment, for either case, the MVP candidate (i.e., the duplicated motion vector from step S1114 or the scaled motion vector from step S1116) is included in the candidate list at step S1118.

In a beneficial embodiment, if both the current reference picture and the neighbouring reference picture have the same reference picture type (including the case when both the reference pictures are particular type of reference pictures), the method proceeds to step S1116. That is, POC-based scaling is performed on the neighbouring motion vector to produce the MVP candidate at step S1116.

The subsequent steps (i.e., S1120, S1122, S1124, and S1126) are respectively the same as steps S920, S922, S924, and S926 described in the first embodiment, and thus need not been repeated again.

Figure 12:
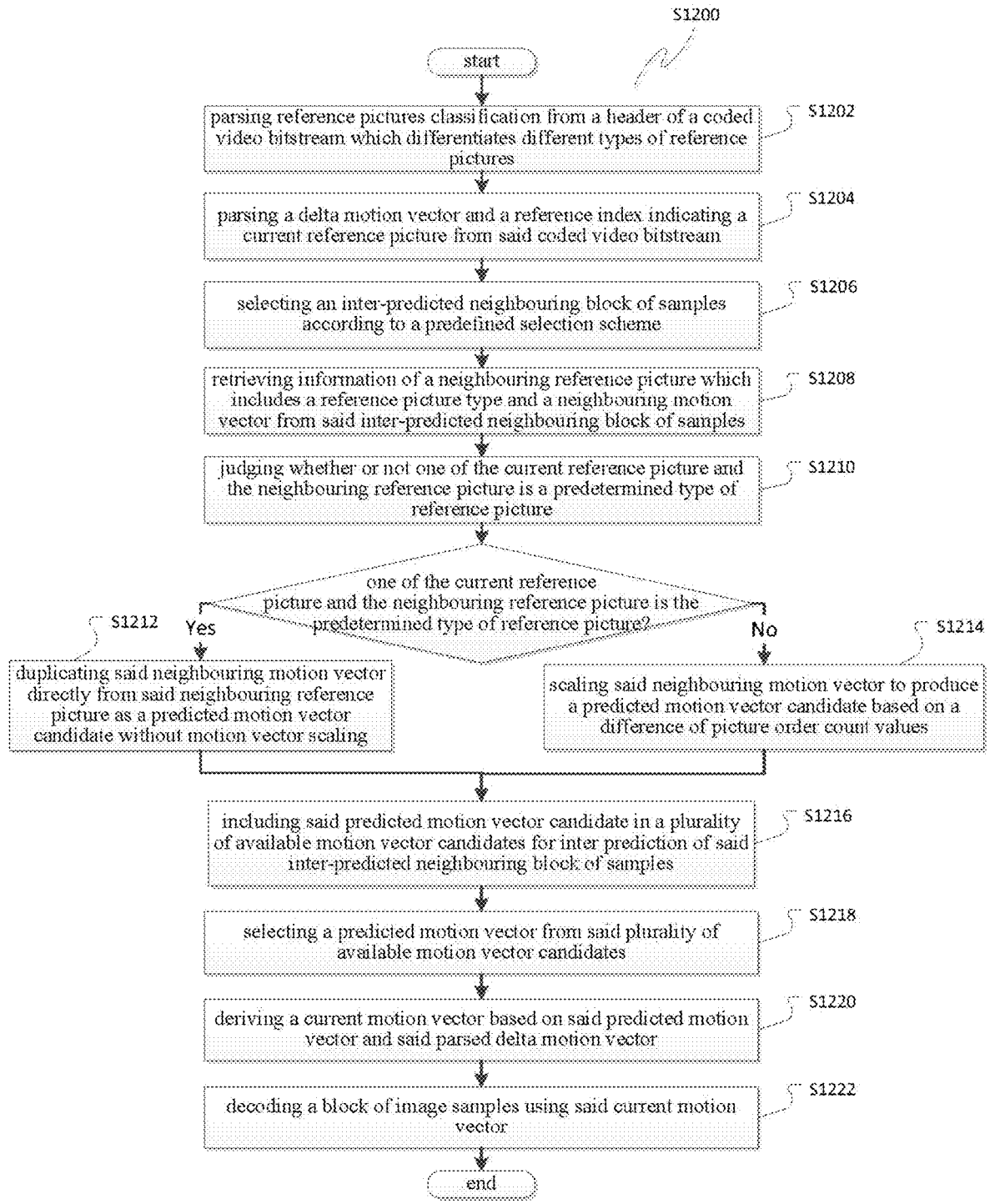
FIG. 12 depicts a flow diagram illustrating a method of decoding a coded video/image according to the second embodiment of the present disclosure.

FIG. 12 depicts a flowchart S1200 illustrating the exemplary steps involved in decoding a coded video/image according to the second embodiment of the present disclosure.

The decoding methods of the first and second embodiments are generally the same except in relation to steps S1212, S1214 and S1216. For clarity and to avoid unnecessary repetition, it is not necessary to describe decoding steps of the second embodiment which are the same or similar as those of the first embodiment (i.e., S1202, S1204, S1206, S1208, S1210, S1218, S1220, and S1222).

In the second embodiment, if one of the current reference picture and the neighbouring reference picture is of the predetermined type of reference pictures, at step S1212, the neighbouring motion vector is duplicated directly to produce the MVP candidate, i.e., without motion vector scaling. Otherwise, if at least one of the current reference picture and the neighbouring reference picture is determined not to be of the predetermined type of reference picture, POC-based scaling is performed on the neighbouring motion vector to produce the MVP candidate at step S1214. In the second embodiment, for either case, the MVP candidate (i.e., the duplicated motion vector from step S1212 or the scaled motion vector from step S1214) is included in the candidate list at step S1216.

In a beneficial embodiment, if both the current reference picture and the neighbouring reference picture have the same reference picture type (including the case when both the reference pictures are particular type of reference pictures), the method proceeds to step S1214. That is, POC-based scaling is performed on the neighbouring motion vector to produce the MVP candidate at step S1214.

The subsequent steps (i.e., S1218, S1220, and S1222) are respectively the same as steps S1018, S1020, and S1022 described in the first embodiment, and thus need not been repeated again.

Third Embodiment

Figure 13:
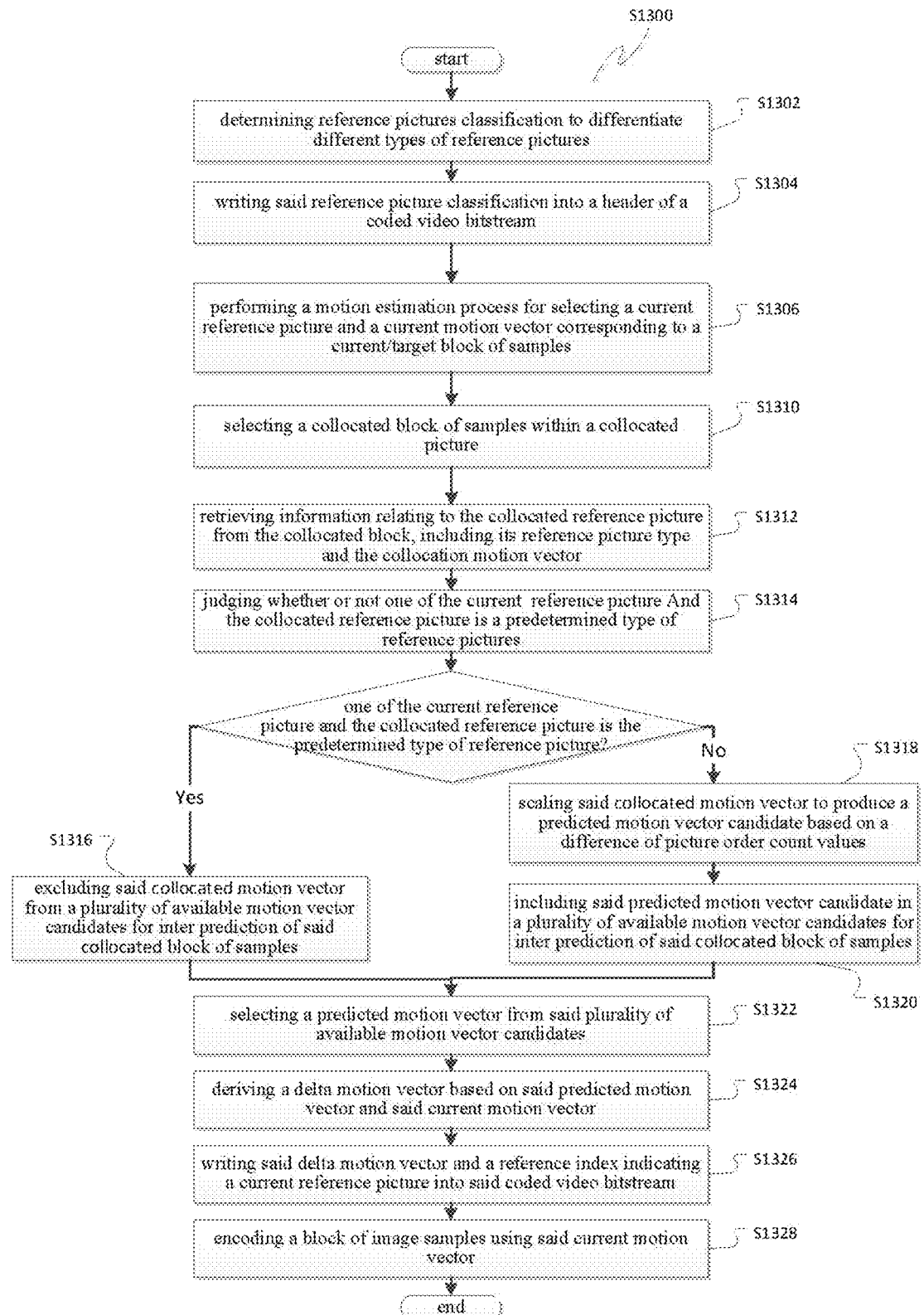
FIG. 13 depicts a flow diagram illustrating a method of encoding a video/image according to a third embodiment of the present disclosure.

FIG. 13 depicts a flowchart S1300 illustrating the exemplary steps involved in encoding a video/image according to a third embodiment of the present disclosure.

The third embodiment relates to temporal motion vector prediction whereas the first embodiment relate to spatial motion vector prediction. Therefore, the encoding method of the third embodiment is generally the same as the encoding method of the first embodiment except in relation to the collocated block 808, collocated picture 810, and collocated reference picture 812 (as compared to the neighbouring block, neighbouring picture and neighbouring reference picture).

As a first step S1302, reference pictures classification is determined to differentiate or identify the type of reference pictures involved. Next at step S1304, reference picture classification parameter(s) is written into a header of the coded video bitstream 200. Motion estimation process is performed at step S1306 for selecting a current reference picture and a current motion vector corresponding to a current or target block of samples. Then, at step S1310, a collocated block 808 is selected according to a predetermined selection scheme as known to a person skilled in the art and thus need not be described herein. As illustrated in FIG. 8, the collocated block 808 within a collocated picture 810 has a motion vector and an associated reference picture 812 pointed to by the motion vector. For simplicity, the motion vector and reference picture of collocated block 808 can be referred to as collocated motion vector and collocated reference picture 812, respectively. At step S1312, information relating to the collocated reference picture is retrieved from the collocated block, including its reference picture type and the collocated motion vector. At step S1314, a decision/judgement is made whether or not one of the current reference picture and the collocated reference picture is a particular or predetermined type of reference picture.

In the third embodiment, if one of the current reference picture or the collocated reference picture is of the predetermined type of reference picture, at step S1316, the collocated motion vector is excluded from a plurality of available motion vector candidates for inter prediction of the current block. Otherwise, if at least one of the current reference picture and the collocated reference picture is determined not to be of the predetermined type of reference picture, POC-based scaling is performed on the neighbouring motion vector to produce a motion vector predictor (MVP) candidate at step S1318 and the MVP candidate is included in the candidate list at step S1320.

In a beneficial embodiment, at step S1314, if both the current reference picture and the collocated reference picture have the same reference picture type (including the case when both the reference pictures are particular type of reference pictures), the method proceeds to step S1318. That is, POC-based scaling is performed on the collocated motion vector to produce a MVP candidate at step S1318 and the MVP candidate is included in the candidate list at step S1320.

At step S1322, a MVP is derived or selected from the plurality of available motion vector candidates (i.e., the candidate list). Based on the MVP and the current motion vector, a delta motion vector is derived at step S1324. The derived delta motion vector and a reference index indicating the current reference picture are written into the coded video bitstream 200 at step S1326. At step S1328, the current block is encoded using the current motion vector.

Figure 14:
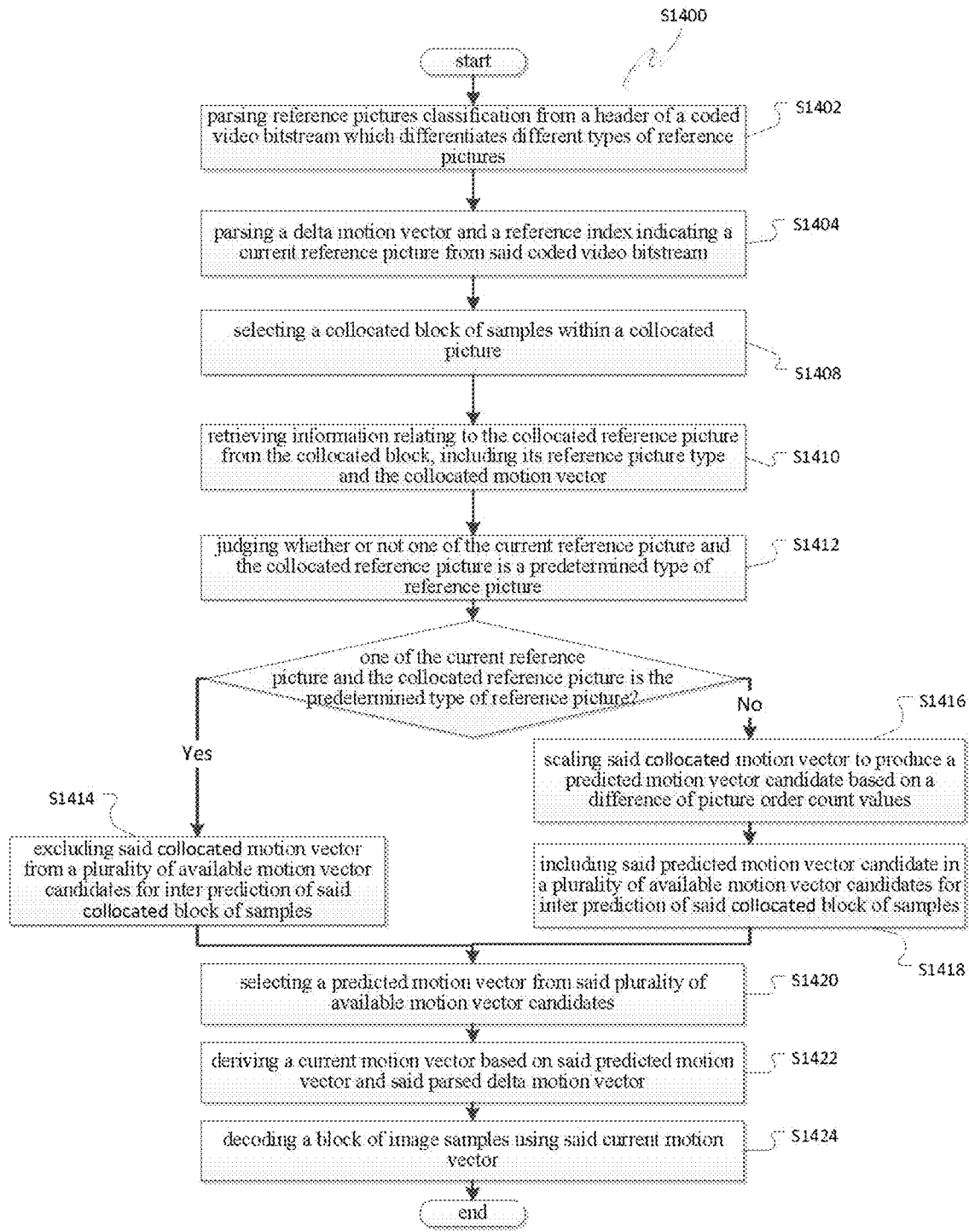
FIG. 14 depicts a flow diagram illustrating a method of decoding a coded video/image according to the third embodiment of the present disclosure.

FIG. 14 depicts a flowchart S1400 illustrating the exemplary steps involved in decoding a coded video/image according to the third embodiment of the present disclosure.

As mentioned hereinbefore, the third embodiment relates to temporal motion vector prediction whereas the first embodiment relate to spatial motion vector prediction. Therefore, the decoding method of the third embodiment is generally the same as the decoding method of the first embodiment except in relation to the collocated block 808, collocated picture 810, and collocated reference picture 812 (as compared to the neighbouring block, neighbouring picture and neighbouring reference picture).

As a first step S1402, reference picture classification parameter(s) 202 is parsed from a header of the coded video bitstream 200 which differentiates or identifies the type of the reference pictures. Next at step S1404, a delta motion vector and a reference index indicating a current reference picture (written into the coded video bitstream 200 at step S1326 of the encoding method described hereinbefore) are parsed from the coded video bitstream 200. Then, at step S1408, an inter-predicted collocated block is selected according to a predefined selection scheme as known to a person skilled in the art and thus need not be described herein. The collocated block 808 within a collocated picture 810 has a motion vector and an associated reference picture 812 pointed to by the motion vector. For simplicity, the motion vector and reference picture of collocated block 808 can be referred to as collocated motion vector and collocated reference picture 812, respectively. At step S1410, information relating to the collocated reference picture is retrieved from the collocated block, including its reference picture type and the collocated motion vector. At step S1412, a decision/judgement is made whether or not one of the current reference picture or the collocated reference picture is a particular or predetermined type of reference picture.

In the third embodiment, in the same manner as described in the encoding method, if one of the current reference picture and the collocated reference picture is of the particular type of reference pictures, at step S1414, the collocated motion vector is excluded from a plurality of available motion vector predictor candidates for inter prediction of the current block.

In a beneficial embodiment, if both the current reference picture and the collocated reference picture have the same reference picture type (including the case when both the reference pictures are particular type of reference pictures), the method proceeds to step S1416. That is, POC-based scaling is performed on the collocated motion vector to produce a MVP candidate at step 1416 and the MVP candidate is included in the candidate list at step 1418.

At step S1420, a MVP is selected from the plurality of available motion vector candidates. At step S1422, a current motion vector is derived based on the MVP and the parsed delta motion vector. At step S1424, the current block is decoded using the current motion vector.

Fourth Embodiment

Figure 15:
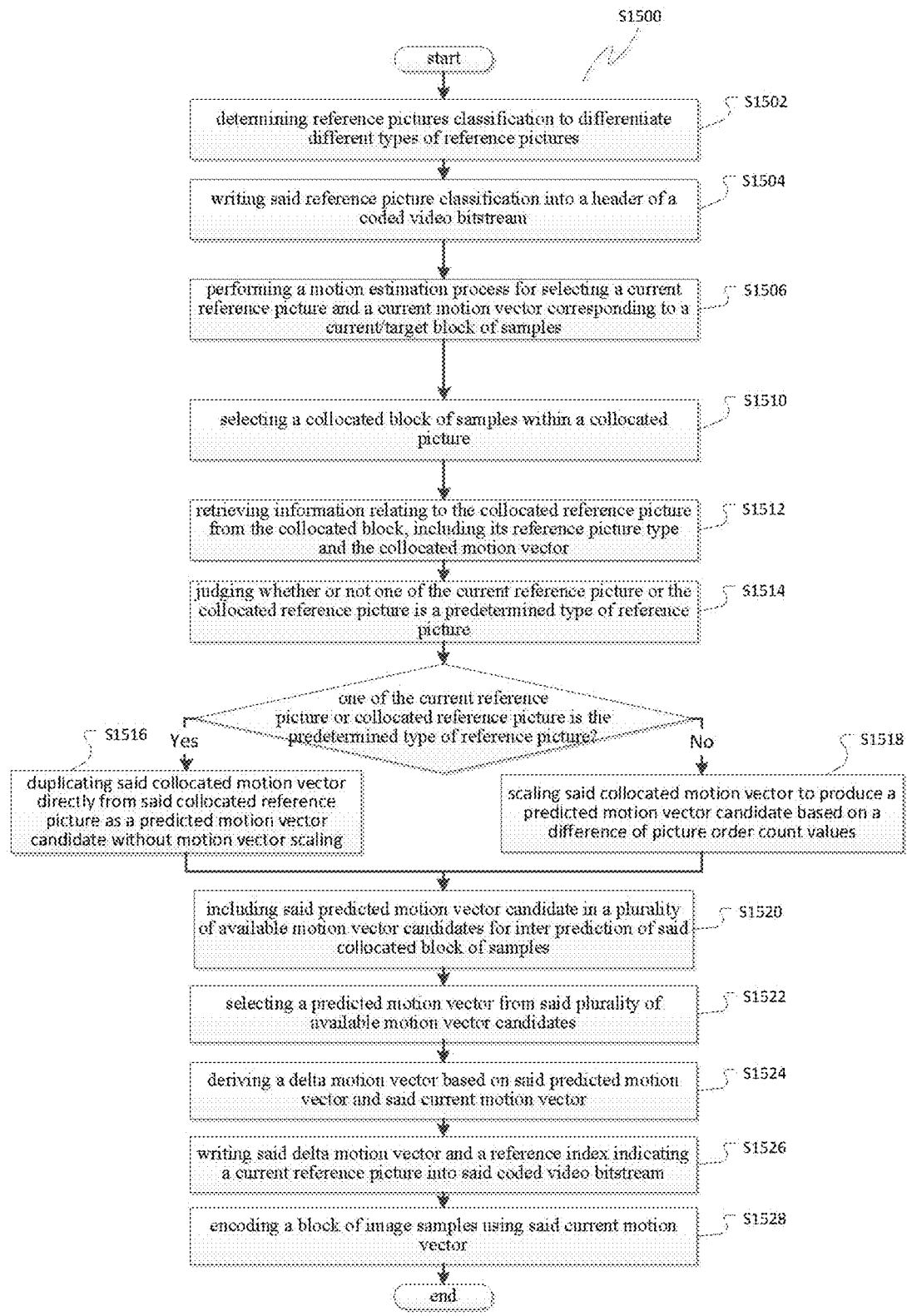
FIG. 15 depicts a flow diagram illustrating a method of encoding a video/image according to a fourth embodiment of the present disclosure.

FIG. 15 depicts a flowchart S1500 illustrating the exemplary steps involved in encoding a video/image according to a fourth embodiment of the present disclosure.

The encoding method of the fourth embodiment is generally the same as the encoding method of the third embodiment except in relation to steps S1516, S1518 and S1520. For clarity and to avoid unnecessary repetition, it is not necessary to describe steps of the fourth embodiment which are the same or similar as those of the third embodiment (i.e., S1502, S1504, S1506, S1510, S1512, S1514, S1522, S1524, S1526 and S1528).

In the fourth embodiment, at step S1514, if one of the current reference picture and the collocated reference picture is of the predetermined type of reference picture, the collocated motion vector is duplicated directly to produce a MVP candidate at step S1516, i.e., without motion vector scaling. Otherwise, if at least one of the current reference picture and the collocated reference picture is determined not to be of the predetermined type of reference picture, POC-based scaling is performed on the collocated motion vector to produce the MVP candidate at step S1518. In the fourth embodiment, for either case, a MVP candidate (i.e., the duplicated motion vector from step S1516 or the scaled motion vector from step S1518) is included in the candidate list at step S1520.

In a beneficial embodiment, if both the current reference picture and the collocated reference picture have the same reference picture type (including the case when both the reference pictures are particular type of reference pictures), the method proceeds to step S1518. That is, POC-based scaling is performed on the collocated motion vector to produce the MVP candidate at step S1518.

The subsequent steps (i.e., S1522, S1524, S1526, and S1528) are respectively the same as steps S1322, S1324, S1326, and S1328 described in the third embodiment, respectively, and thus need not been repeated again.

Figure 16:
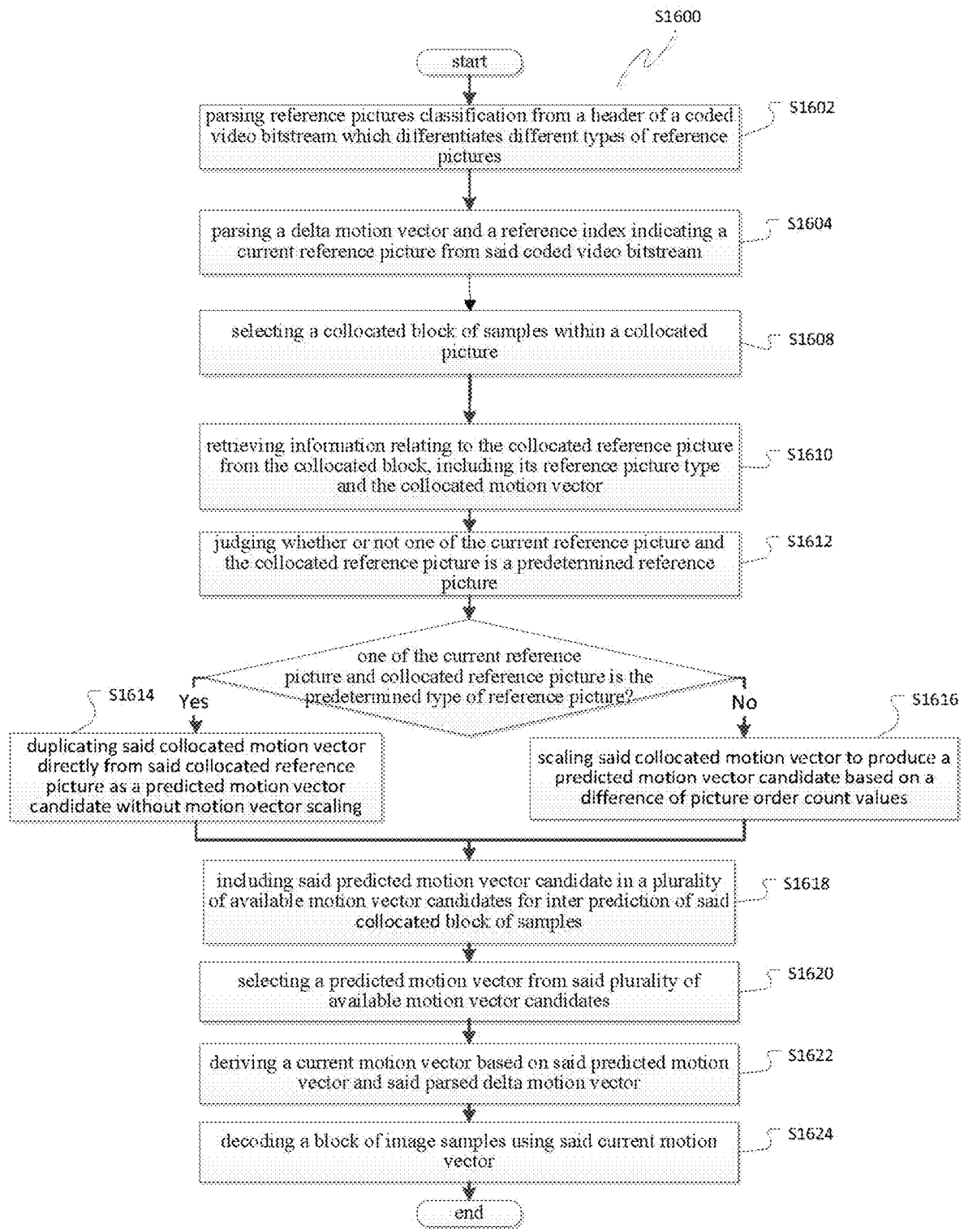
FIG. 16 depicts a flow diagram illustrating a method of decoding a coded video/image according to the fourth embodiment of the present disclosure.

FIG. 16 depicts a flowchart S1600 illustrating the exemplary steps involved in decoding a coded video/image according to the fourth embodiment of the present disclosure.

The decoding method of the fourth embodiment is generally the same as the decoding method of the third embodiment except in relation to steps S1614, S1616 and S1618. For clarity and to avoid unnecessary repetition, it is not necessary to describe steps of the fourth embodiment which are the same or similar as those of the third embodiment (i.e., S1602, S1604, S1608, S1610, S1612, S1620, S1622, and S1624).

In the fourth embodiment, at step S1612, if one of the current reference picture and the collocated reference picture is of the predetermined type of reference picture, the collocated motion vector is duplicated directly to produce the MVP candidate at step S1614, i.e., without motion vector scaling. Otherwise, if at least one of the current reference picture and the collocated reference picture is determined not to be of the predetermined type of reference picture, POC-based scaling is performed on the collocated motion vector to produce the MVP candidate at step S1616. In the fourth embodiment, for either case, the MVP candidate (i.e., the duplicated motion vector from step S1614 or the scaled motion vector from step S1616) is included in the candidate list at step S1618.

In a beneficial embodiment, if at step S1612 both the current reference picture and the collocated reference picture is determined to have the same reference picture type (including the case when both the reference pictures are particular type of reference pictures), the method proceeds to step S1616. That is, POC-based scaling is performed on the collocated motion vector to produce the MVP candidate at step S1616.

The subsequent steps (i.e., S1620, S1622, and S1624) are the same as steps S1420, S1422, and S1424 described in the third embodiment, respectively, and thus need not been repeated again.

Fifth Embodiment

Figure 17:
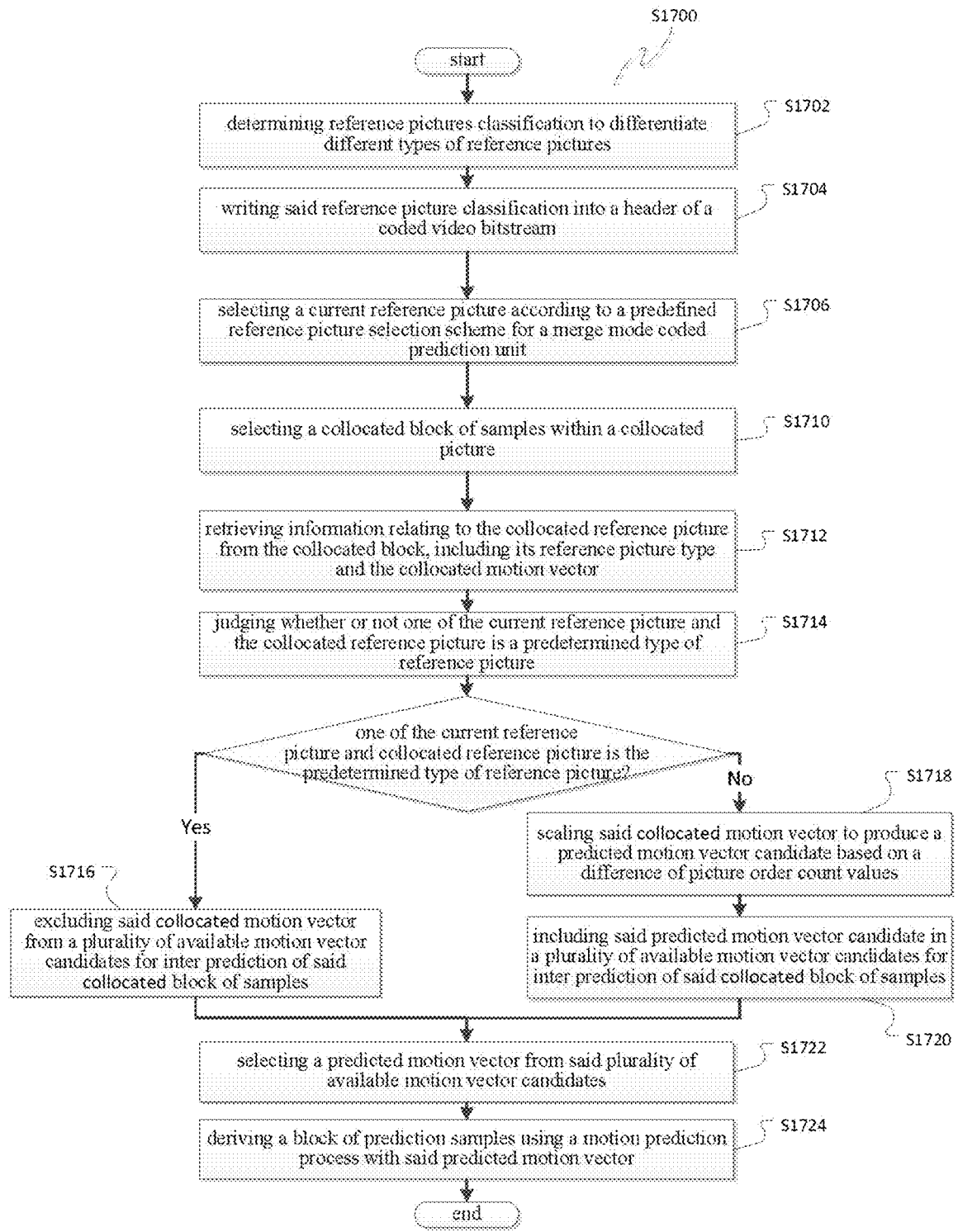
FIG. 17 depicts a flow diagram illustrating a method of encoding a video/image according to a fifth embodiment of the present disclosure.

FIG. 17 depicts a flowchart S1700 illustrating the exemplary steps involved in encoding a video/image according to a fifth embodiment of the present disclosure.

The fifth embodiment relates to a type of motion vector prediction referred to as merge mode, e.g., the prediction unit is encoded in merge mode. Therefore, the encoding method of the fifth embodiment is the same as the encoding method of the third embodiment except in relation to the selection of the current picture in step S1706 (which will be based on that for a merge mode coded prediction unit) and without the need to determine a delta motion vector to be written into the coded video bitstream 200.

In particular, at step S1706, a current reference picture is selected according to a predefined reference picture selection scheme for a merge mode coded prediction unit (instead of step S1506 in the third embodiment). The method then proceeds in the same manner as described in the third embodiment. However, after step S1722 of selecting a MVP from the plurality of available motion vector candidates, a block of samples is encoded using the MVP in S1724 (instead of step S1324 in the third embodiment of deriving a delta motion vector).

Figure 18:
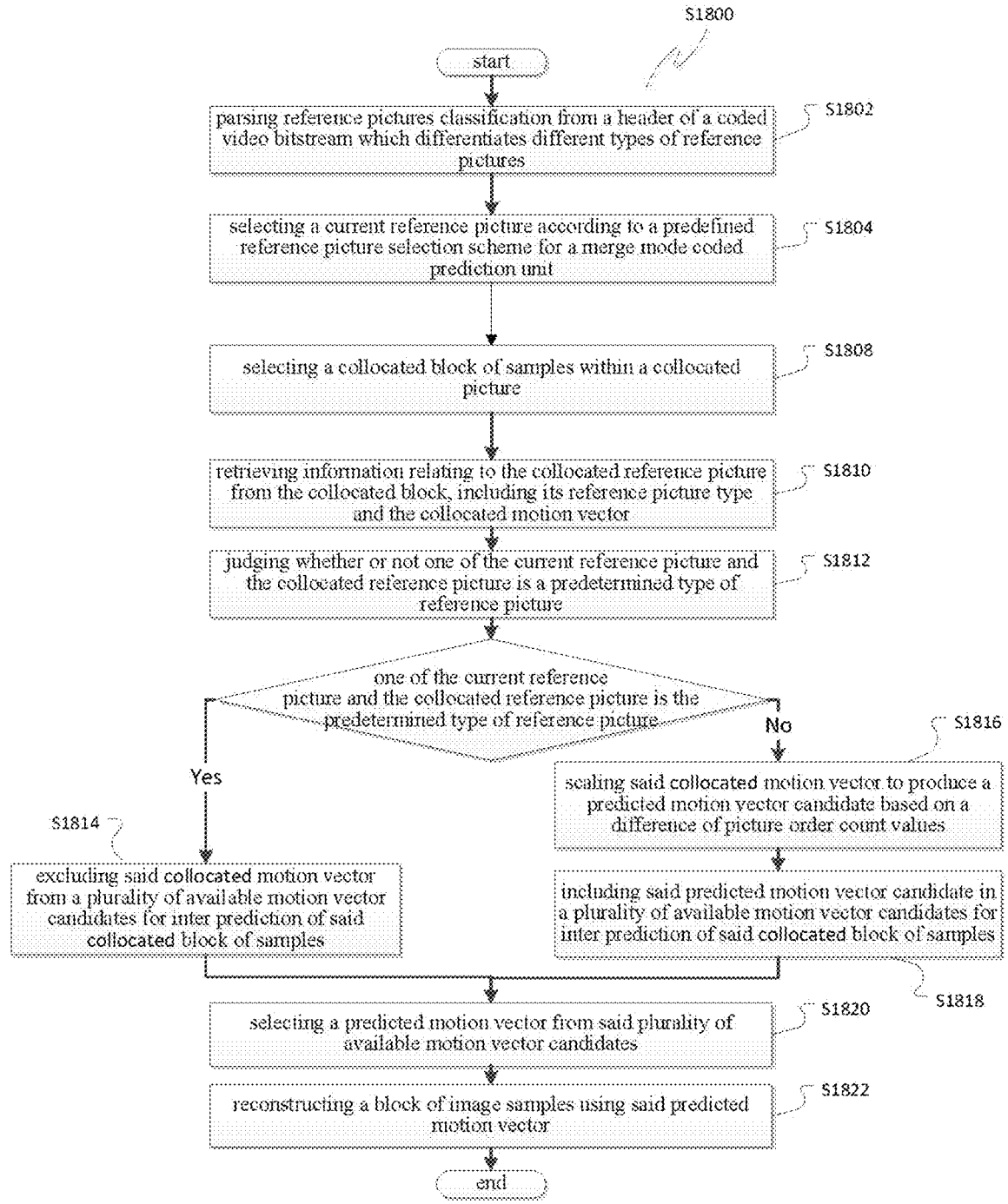
FIG. 18 depicts a flow diagram illustrating a method of decoding a coded video/image according to the fifth embodiment of the present disclosure.

FIG. 18 depicts a flowchart S1800 illustrating the exemplary steps involved in decoding a coded video/image according to the fifth embodiment of the present disclosure.

As mentioned hereinbefore, the fifth embodiment relates to a type of motion vector prediction referred to as merge mode, e.g., the prediction unit is encoded in merge mode. Therefore, the decoding method of the fifth embodiment is the same as the decoding method of the third embodiment except in relation to the selection of the current picture in step S1804 (which will be based on that for a merge mode coded prediction unit) and without the need to parse the delta motion vector from the coded video bitstream 200.

In particular, at step S1804, a current reference picture is selected according to a predefined reference picture selection scheme for a merge mode coded prediction unit (instead of step S1404 in the third embodiment). The method then proceeds in the same manner as described in the third embodiment. However, after step S1820 of selecting a MVP from the plurality of available motion vector candidates, a block of samples is reconstructed using the selected MVP in S1822 (instead of step S1422 in the third embodiment of deriving a current motion vector based on the parsed delta motion vector).

Sixth Embodiment

Figure 19:
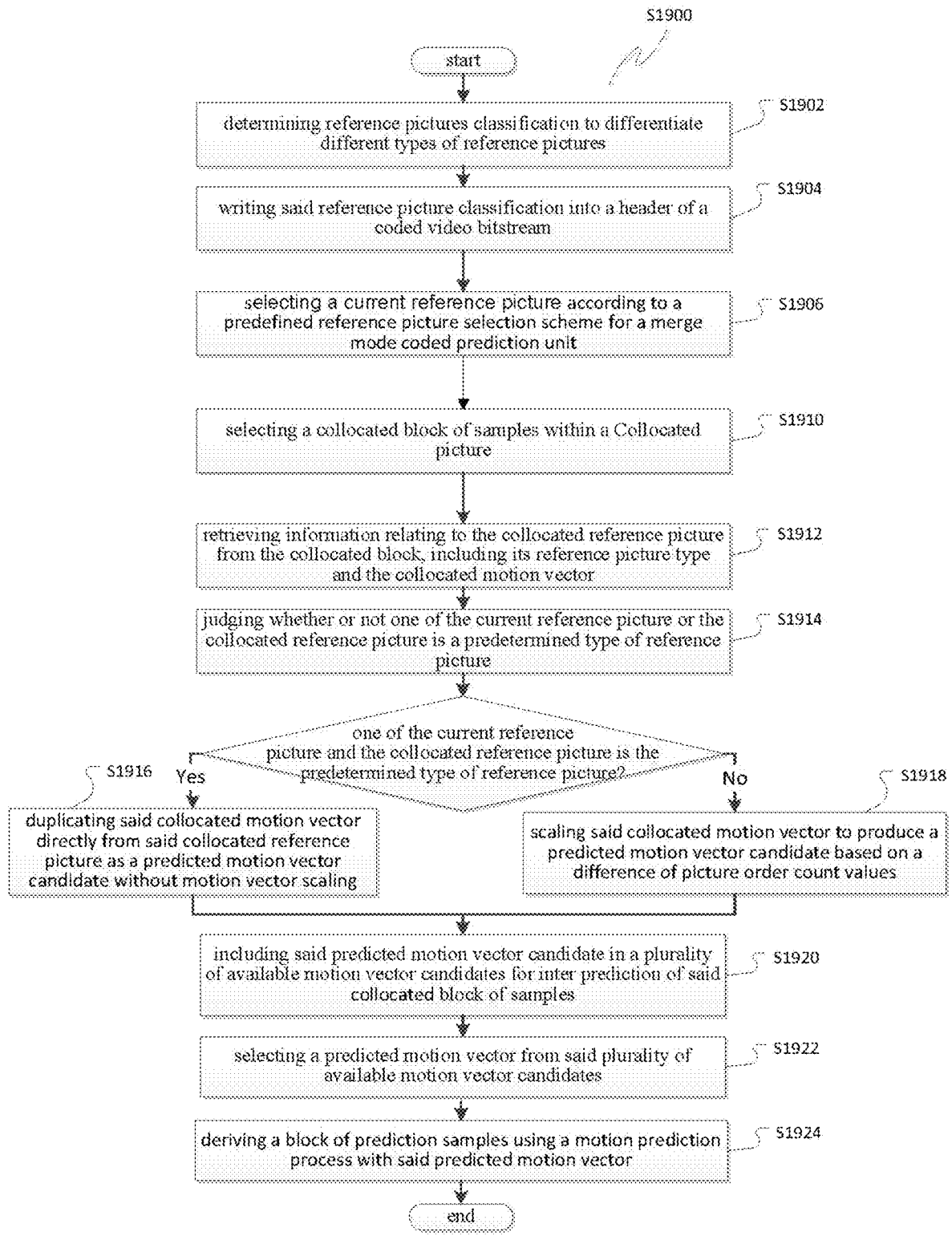
FIG. 19 depicts a flow diagram illustrating a method of encoding a video/image according to a sixth embodiment of the present disclosure.

FIG. 19 depicts a flowchart S1900 illustrating the exemplary steps involved in encoding a video/image according to a sixth embodiment of the present disclosure.

The sixth embodiment also relates to a type of motion vector prediction referred to as merge mode, e.g., the prediction unit is encoded in merge mode. In particular, the encoding method of the sixth embodiment is the same as the encoding method of the fourth embodiment except in relation to the selection of the current picture in step S1906 (which will be based on that for a merge mode coded prediction unit) and without the need to determine a delta motion vector to be written into the coded video bitstream 200.

In particular, at step S1906, a current reference picture is selected according to a predefined reference picture selection scheme for a merge mode coded prediction unit (instead of step S1506 in the fourth embodiment). The method then proceeds in the same manner as described in the fourth embodiment. However, after step S1922 of selecting a MVP from the plurality of available motion vector candidates, the current block of samples is encoded using the MVP in S1924 (instead of step S1524 in the fourth embodiment of deriving a delta motion vector).

Figure 20:
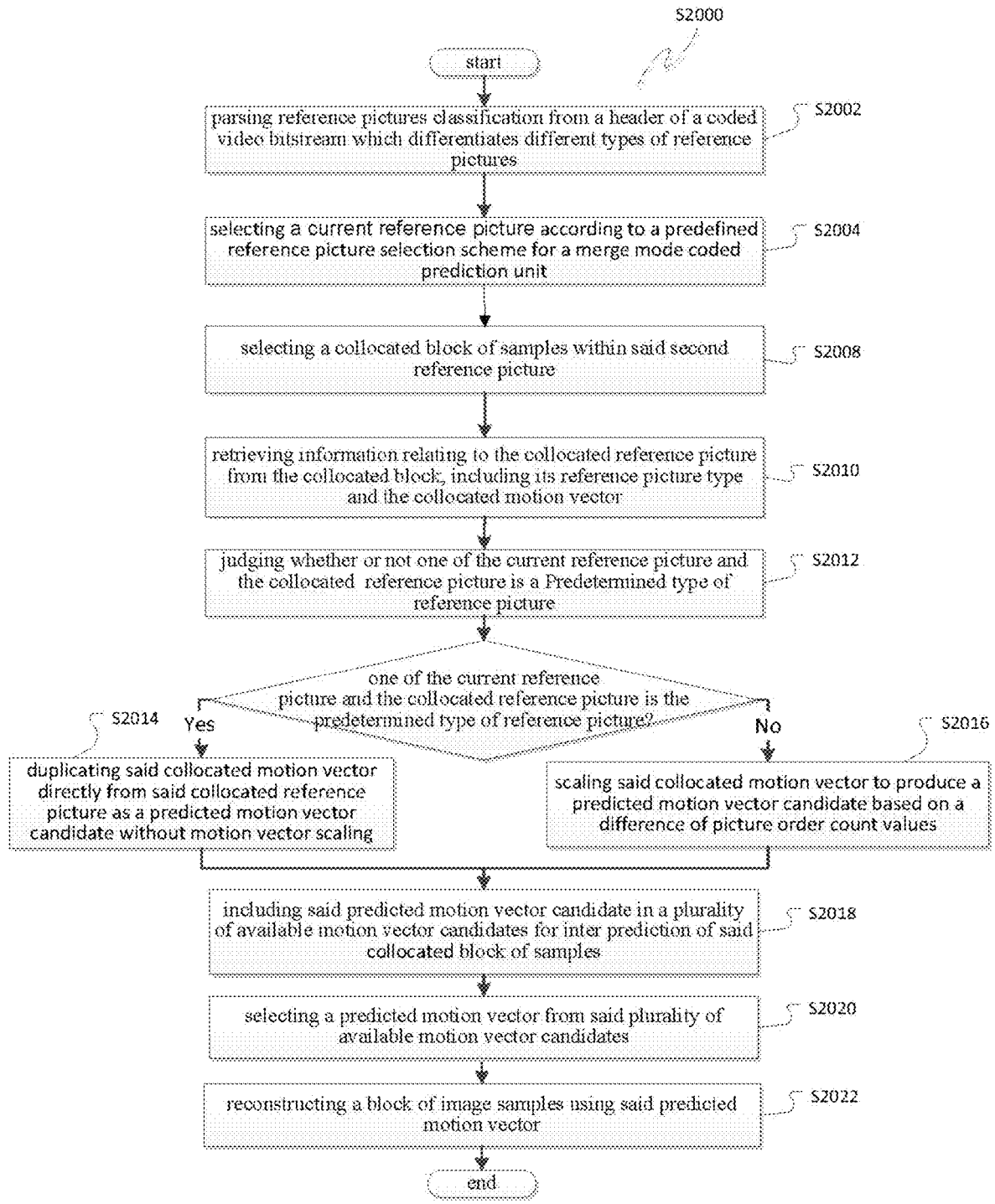
FIG. 20 depicts a flow diagram illustrating a method of decoding a coded video/image according to the sixth embodiment of the present disclosure.

FIG. 20 depicts a flowchart S2000 illustrating the exemplary steps involved in decoding a coded video/image according to the sixth embodiment of the present disclosure.

As mentioned hereinbefore, the sixth embodiment also relates to a type of motion vector prediction referred to as merge mode, e.g., the prediction unit is encoded in merge mode. In particular, the decoding method of the sixth embodiment is the same as the decoding method of the fourth embodiment except in relation to the selection of the current picture in step S2004 (which will be based on that for a merge mode coded prediction unit) and without the need to parse the delta motion vector from the coded video bitstream 200.

In particular, at step S2004, a current reference picture is selected according to a predefined reference picture selection scheme for a merge mode coded prediction unit (instead of step S1604 in the fourth embodiment). The method then proceeds in the same manner as described in the fourth embodiment. However, after step S2020 of selecting a MVP from the plurality of available motion vector candidates, a block of samples is reconstructed using the selected MVP in S2022 (instead of step S1622 in the fourth embodiment of deriving a current motion vector based on the parsed delta motion vector).

Figure 21:
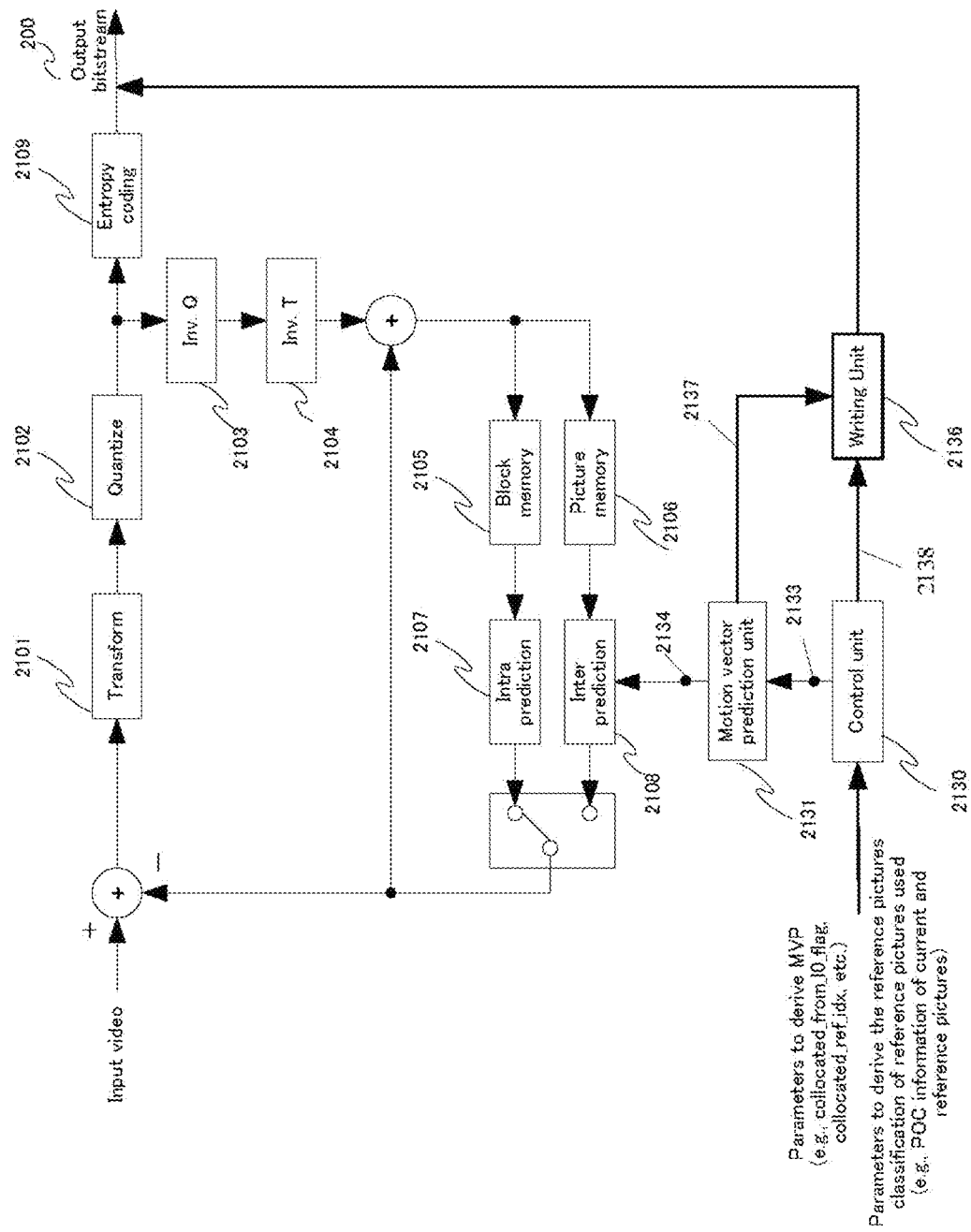
FIG. 21 depicts a block diagram showing an exemplary structure of a video/image encoding apparatus according to one exemplary embodiment.

FIG. 21 depicts a block diagram showing an exemplary structure of video/image encoding apparatus 2100 according to an embodiment disclosed herein.

The video encoding apparatus 2100 is configured for encoding an input video/image bit stream on a block-by-block basis so as to generate an encoded output bit stream 200. As shown in FIG. 21, the video encoding apparatus 2100 may comprise a transformation unit 2101, a quantization unit 2102, an inverse quantization unit 2103, an inverse transformation unit 2104, a block memory 2105, a picture/frame memory 2106, an intra prediction unit 2107, an inter prediction unit 2108, an entropy encoding unit 2109, a control unit 2130, a motion vector prediction unit 2131 and a writing unit 2136.

An exemplary operational flow will now be described. An input video is inputted to an adder, and the added value is outputted to the transformation unit 2101. The transformation unit 2101 transforms the added values into frequency coefficients, and outputs the resulting frequency coefficients to the quantization unit 2102. The quantization unit 2102 quantizes the inputted frequency coefficients, and outputs the resulting quantized values to the inverse quantization unit 2103 and the entropy coding unit 2109. The entropy coding unit 2109 encodes the quantized values outputted from the quantization unit 2102, and outputs a coded bitstream 200.

The inverse quantization unit 2103 inversely quantizes the sample values outputted from the quantization unit 2102, and outputs the frequency coefficients to the inverse transformation unit 2104. The inverse transformation unit 2104 performs inverse frequency transform on the frequency coefficients so as to transform the frequency coefficients into sample values of the bit stream, and outputs the resulting sample values to an adder. The adder adds the sample values of the bit stream outputted from the inverse transformation unit 2104 to the predicted video/image values outputted from the inter/intra prediction unit 2107, 2108, and outputs the resulting added values to the block memory 2105 or the picture memory 2106 for further prediction. The inter/intra prediction unit 2107, 2108 searches within reconstructed videos/images stored in the block memory 2105 or from reconstructed videos/images in frame memory 2110, and estimates a video/image area which is e.g. most similar to the input videos/images for prediction. The inter prediction unit 2107 performs the prediction process based on the derived or selected motion vector output from the motion vector prediction unit 2131 to produce the predicted video/image values (i.e., predictive block or a block or prediction samples for the current block).

The control unit 2130 receives parameters for deriving MVP (e.g., collocated_from_l0_flag, and collocated_ref_idx) and parameters for deriving the reference picture classification of the reference pictures involved (e.g., POC information of the reference pictures involved). Based on a type of the reference pictures involved as described hereinbefore according to embodiments disclosed herein, the control unit 2130 is configured to decide whether to scale the motion vector to produce the motion vector predictor candidate for inclusion in the candidate set, and/or whether to include the motion vector in the candidate set. The control unit 2130 then outputs a signal 2133 indicative of the decision to the motion vector prediction unit 2131.

The motion vector prediction unit 2131 is configured to derive a motion vector predictor candidate for the candidate list (of motion vector predictor candidates) for the current block having a current motion vector and a current reference picture. The motion vector prediction unit 2131 is also configured to derive a motion vector predictor 2134 based on a selected motion vector candidate from the candidate list. The motion vector prediction unit 2130 then outputs a signal indicative of the derived motion vector predictor to the inter prediction unit 2131 for performing motion vector prediction. The writing unit 2136 is configured to write the reference index 2137 indicating the current reference picture from the motion vector prediction unit 2131 and the reference picture classification parameter 2138 from the control unit 2130 to the output coded bitstream 200.

Figure 22:
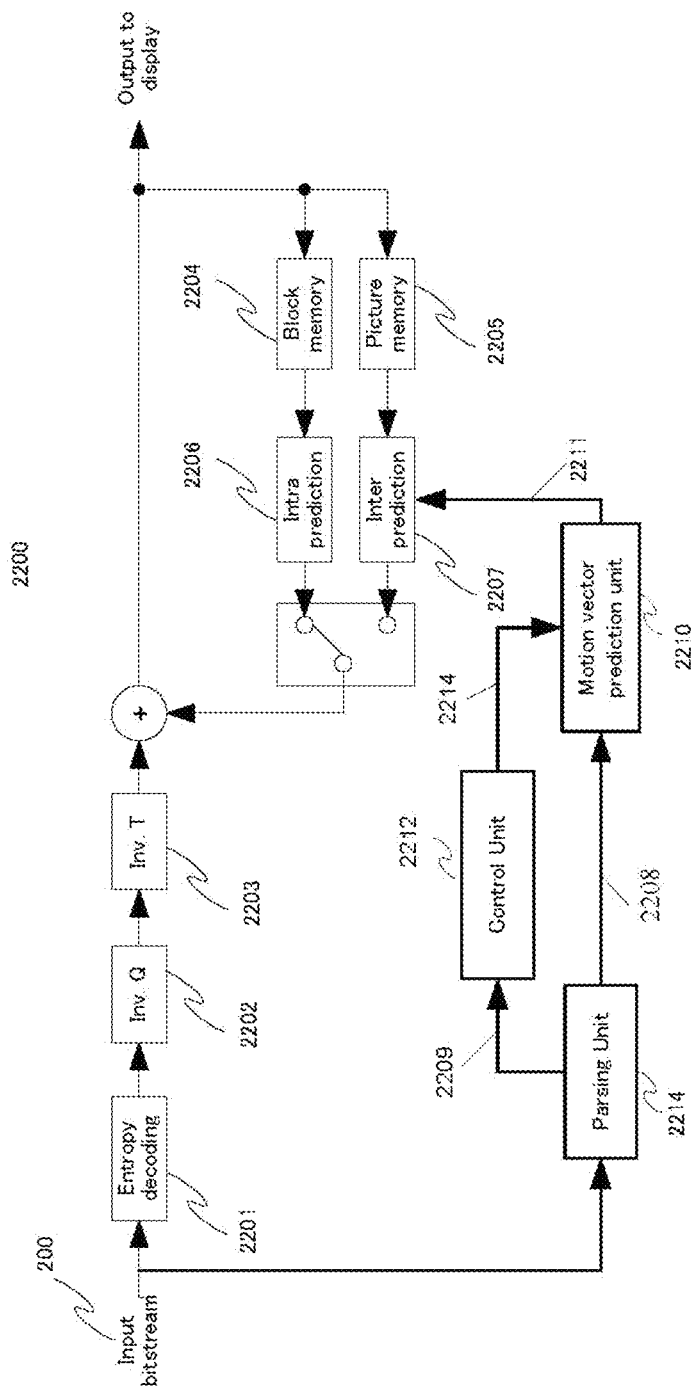
FIG. 22 depicts a block diagram showing an exemplary structure of a video/image decoding apparatus according to one exemplary embodiment.

FIG. 22 depicts a block diagram showing an exemplary structure of a video decoding apparatus 2200 according to an embodiment disclosed herein.

The video decoding apparatus 2200 is configured for decoding an input coded bit stream on a block-by-block basis and outputting videos/images. As shown in as shown in FIG. 22, the video decoding apparatus 2200 comprises an entropy decoding unit 2201, an inverse quantization unit 2202, an inverse transformation unit 2203, an block memory 2204, an picture/frame memory 2205, an intra prediction unit 2206, an inter prediction unit 2207, a motion vector prediction unit 2210, a control unit 2212, and a parsing unit 2212.

An input encoded bit stream is inputted to the entropy decoding unit 2201. After the input encoded bit stream is inputted to the entropy decoding unit 2201, the entropy decoding unit 2201 decodes the input encoded bit stream, and outputs the decoded values to the inverse quantization unit 2202. The inverse quantization unit 2202 inversely quantizes the decoded values, and outputs the frequency coefficients to the inverse transformation unit 2203. The inverse transformation unit 2203 performs inverse frequency transform on the frequency coefficients to transform the frequency coefficients into sample values, and outputs the resulting pixel values to an adder. The adder adds the resulting pixel values to the predicted video/image values (i.e., predictive block or a block or prediction samples for the current block) outputted from the intra/inter prediction unit 2206, 2207, and outputs the resulting values to display, and outputs the resulting values to the block memory 2204 or the picture memory 308 for further prediction. In addition, the intra/inter prediction unit 2206, 2207 searches within videos/images stored in the block memory 2204 or from reconstructed videos/images in the frame memory 2205, and estimates a video/image area which is e.g. most similar to the decoded videos/images for prediction. The inter prediction unit 2207 performs the prediction process based on the derived or selected motion vector 2211 output from the motion vector prediction unit 2210 to produce the predicted video/image values.

The parsing unit 2214 is configured to parse reference picture classification parameter 309, a block of residual samples, a delta motion vector and a reference index indicating a current reference picture from the coded video bitstream 200.

The motion vector prediction unit 2210 is configured to derive a motion vector predictor candidate for a candidate list (of motion vector predictor candidates) for the current block having a current motion vector and a current reference picture. The motion vector prediction unit 2210 is also configured to derive a motion vector predictor based on the candidate list. The motion vector prediction unit 2210 then outputs a signal indicative of the derived motion vector predictor to the inter prediction unit 2211 for performing motion vector prediction.

The control unit 2212 is configured to select a reference picture out of a plurality of available reference pictures, select a block of samples within the reference picture, and receive a motion vector of a neighbouring block or a collocated block of the current block. The motion vector has an associated reference picture (i.e., pointed to by the motion vector). The control unit 2212 is also configured for deciding whether to scale said motion vector to produce the motion vector predictor candidate, and/or whether to include said motion vector in the candidate set, based on a type of the current reference picture and/or a type of said associated reference picture. The control unit 2212 outputs a signal 2214 indicative of the decision to the motion vector prediction unit 2210 for deriving the motion vector predictor candidate based on the signal 2214.

Accordingly, the efficiency of the motion vector prediction processes according to embodiments described hereinbefore are improved since unnecessary or undesirable scaling steps (i.e., scaling which results in an inaccurate motion vector predictor being produced) are reduced or removed.

Each of the structural elements in each of the above-described embodiments may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or a semiconductor memory.

The herein disclosed subject matter is to be considered descriptive and illustrative only, and the appended Claims are of a scope intended to cover and encompass not only the particular embodiments disclosed, but also equivalent structures, methods, and/or uses.

Seventh Embodiment

The processing described in each of embodiments can be simply implemented in an independent computer system, by recording, in a recording medium, a program for implementing the configurations of the moving picture coding method (image coding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

Figure 23:
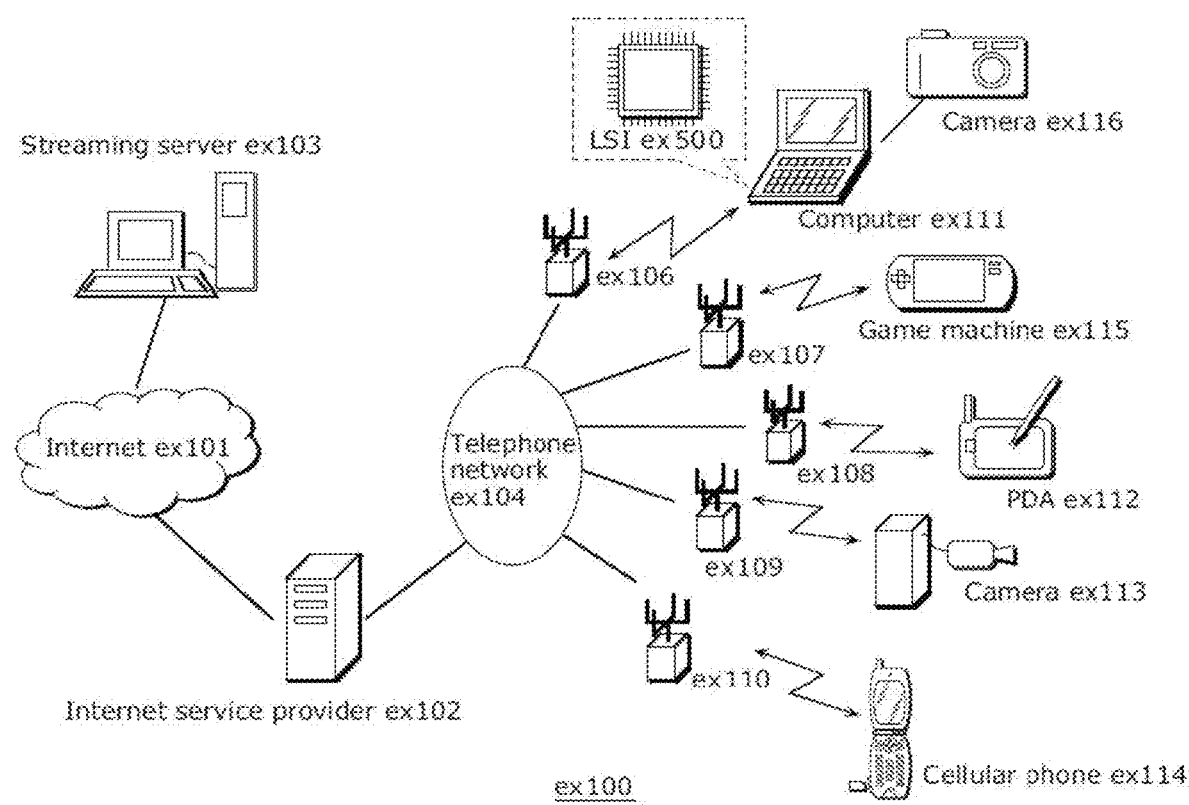
FIG. 23 shows an overall configuration of a content providing system for implementing content distribution services.

FIG. 23 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 23, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus according to an aspect of the present disclosure), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an aspect of the present disclosure).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 24:
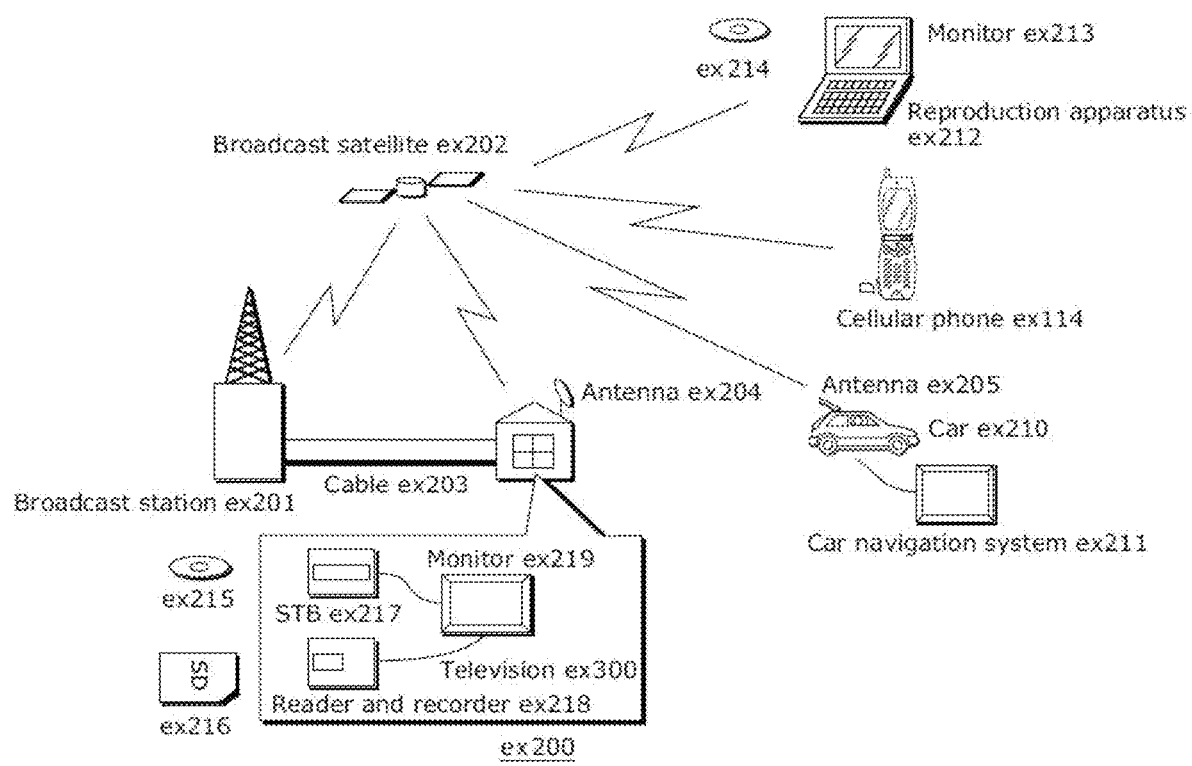
FIG. 24 shows an overall configuration of a digital broadcasting system.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 24. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus according to an aspect of the present disclosure). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present disclosure).

Furthermore, a reader/recorder ex218 (i) reads and decodes the multiplexed data recorded on a recording medium ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 25:
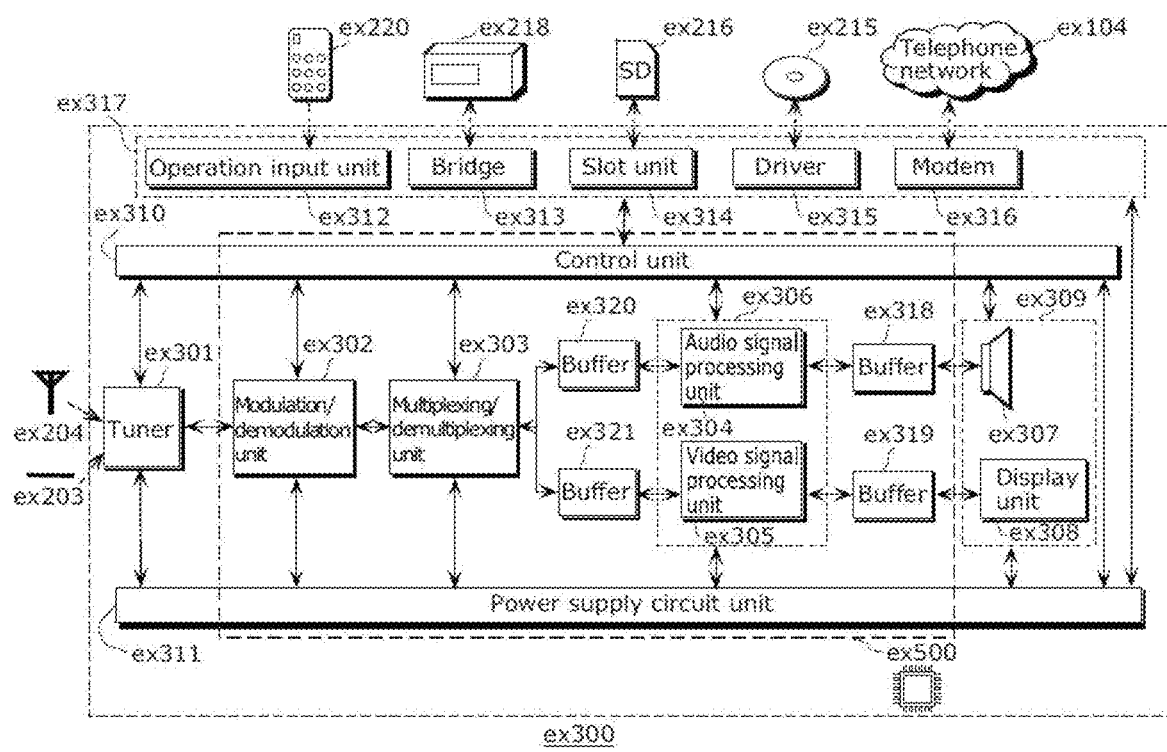
FIG. 25 shows a block diagram illustrating an example of a configuration of a television.

FIG. 25 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present disclosure); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 26:
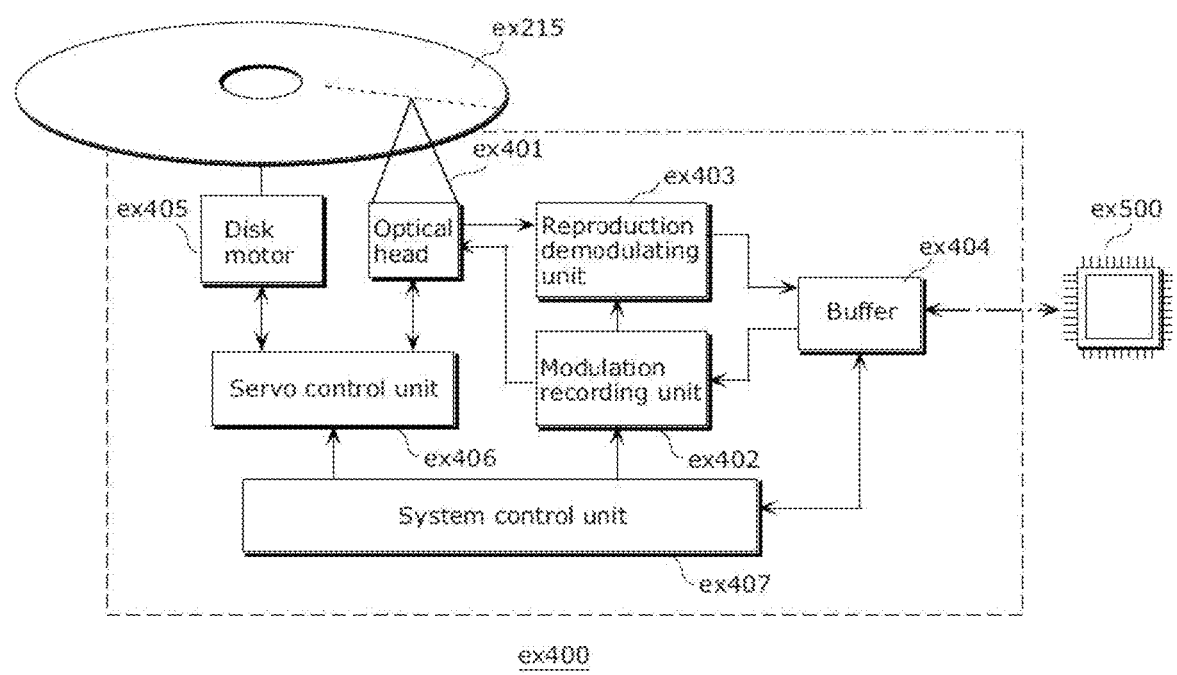
FIG. 26 shows a block diagram illustrating an example of a configuration of an information reproducing/recording unit that reads and writes information from and on a recording medium that is an optical disk.

As an example, FIG. 26 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 27:
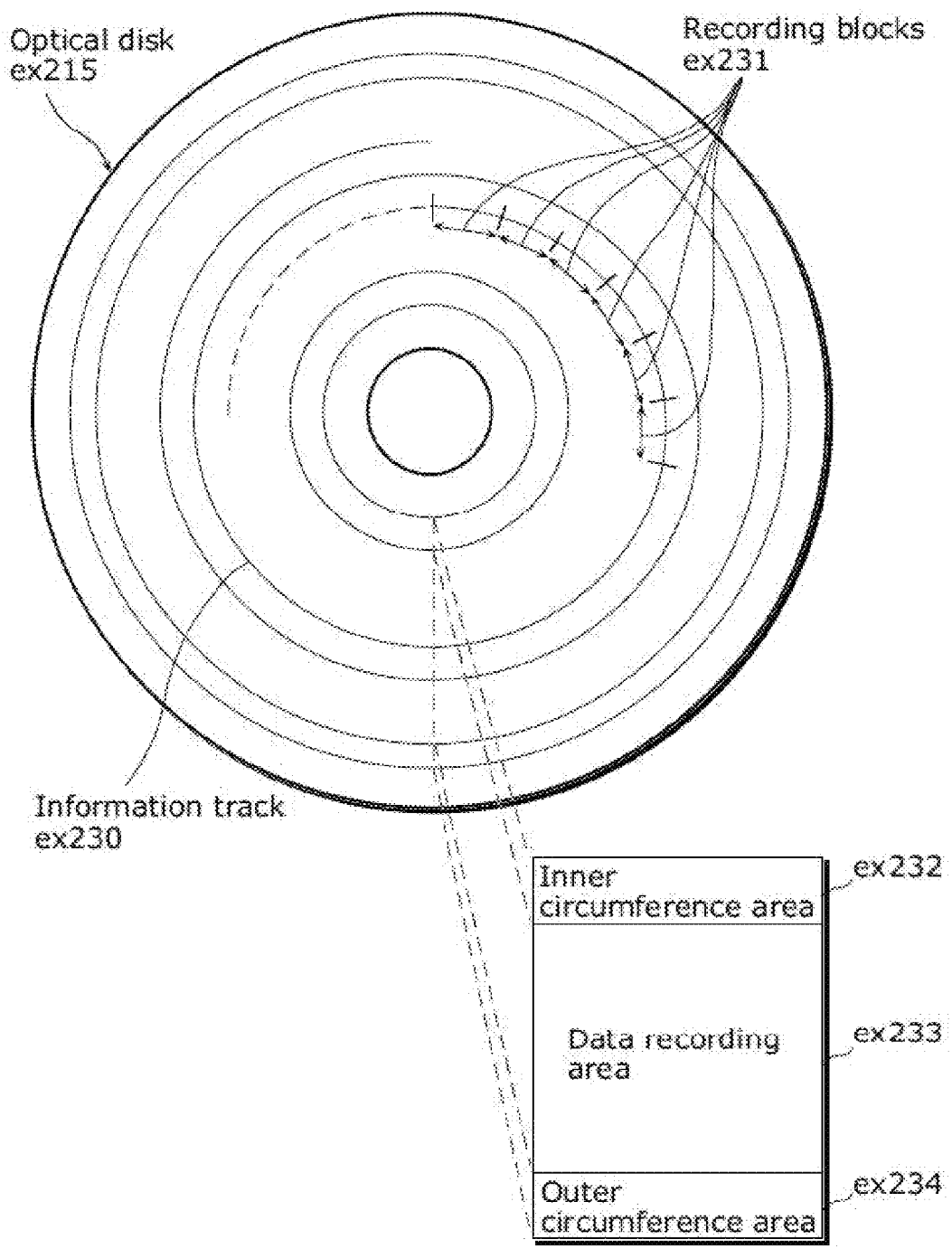
FIG. 27 shows an example of a configuration of a recording medium that is an optical disk.

FIG. 27 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 25. The same will be true for the configuration of the computer ex111, the cellular phone ex114, and others.

Figure 28A:
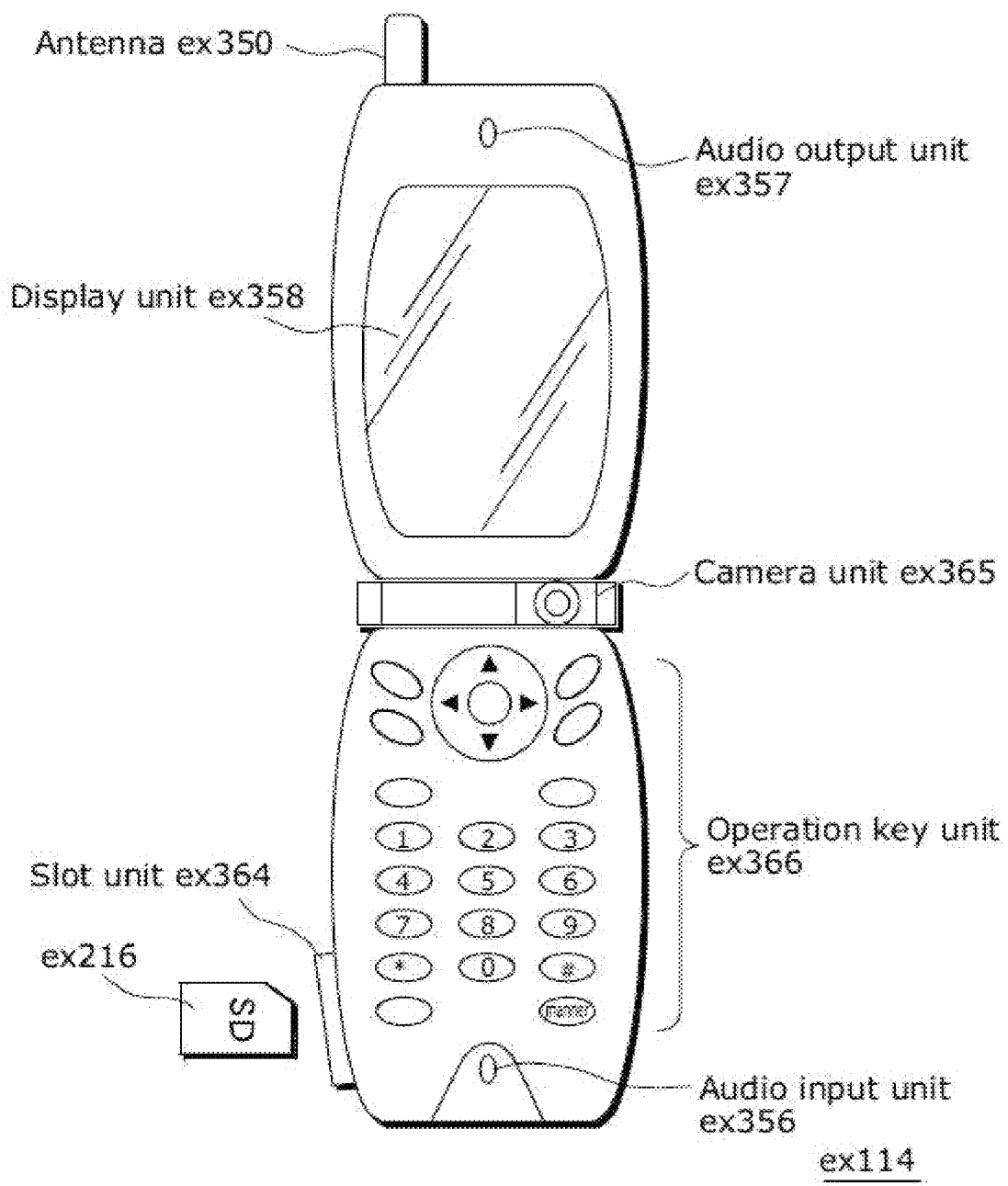
FIG. 28A shows an example of a cellular phone.

FIG. 28A illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 28B:
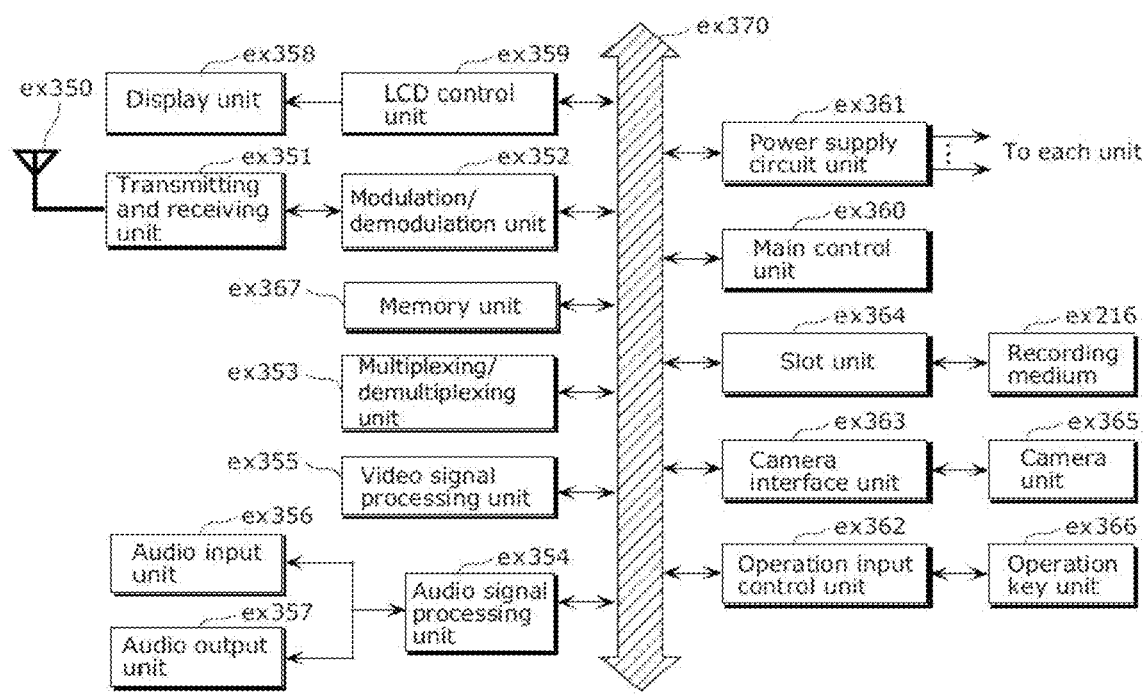
FIG. 28B is a block diagram showing an example of a configuration of a cellular phone.

Next, an example of a configuration of the cellular phone ex114 will be described with reference to FIG. 28B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus according to the aspect of the present disclosure), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the aspect of the present disclosure), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, various modifications and revisions can be made in any of the embodiments in the present disclosure.

Eighth Embodiment

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, an appropriate decoding method cannot be selected.

In view of this, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

FIG. 29 illustrates a structure of the multiplexed data. As illustrated in FIG. 29, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 30:
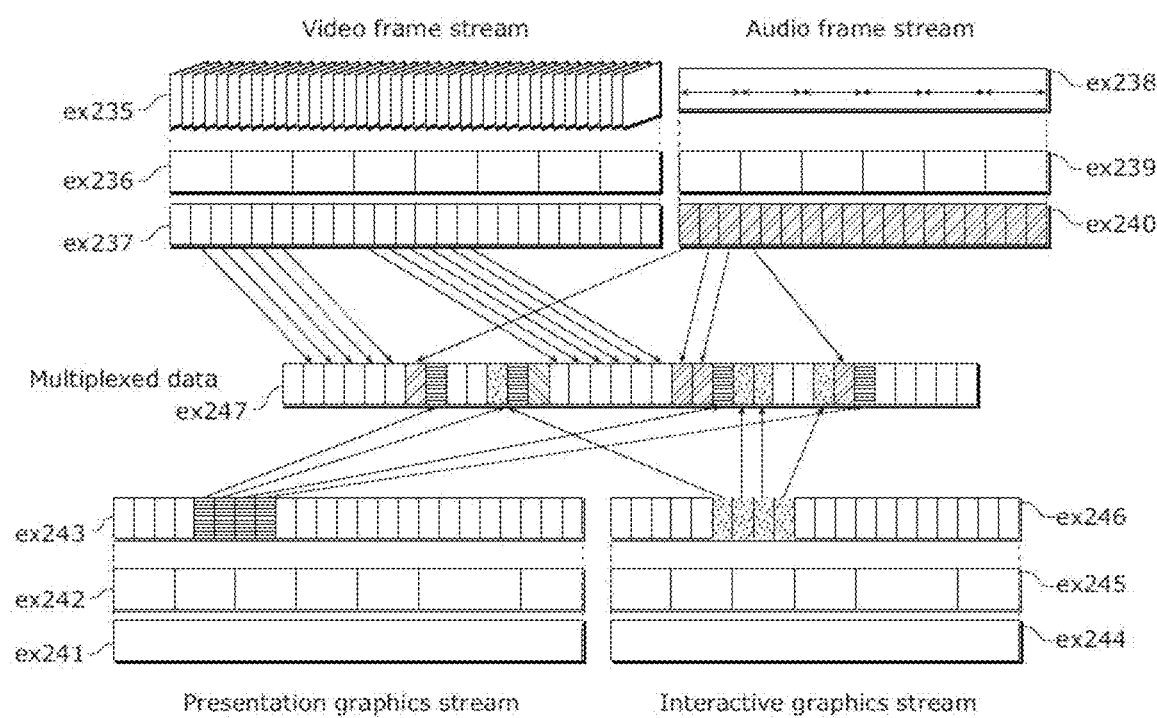
FIG. 30 schematically shows how each stream is multiplexed in multiplexed data.

FIG. 30 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 31:
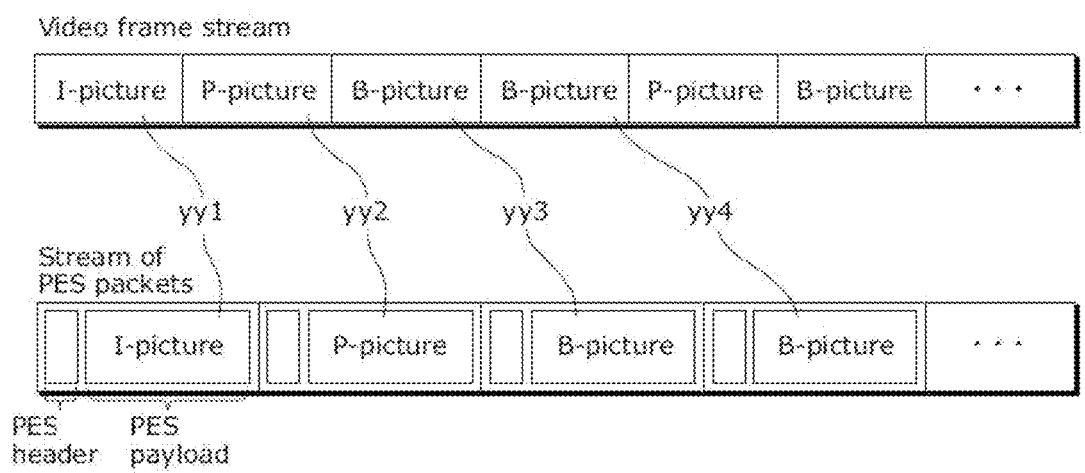
FIG. 31 shows how a video stream is stored in a stream of PES packets in more detail.

FIG. 31 illustrates how a video stream is stored in a stream of PES packets in more detail. The first bar in FIG. 31 shows a video frame stream in a video stream. The second bar shows the stream of PES packets. As indicated by arrows denoted as yy1, yy2, yy3, and yy4 in FIG. 31, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 32 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 32. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 33:
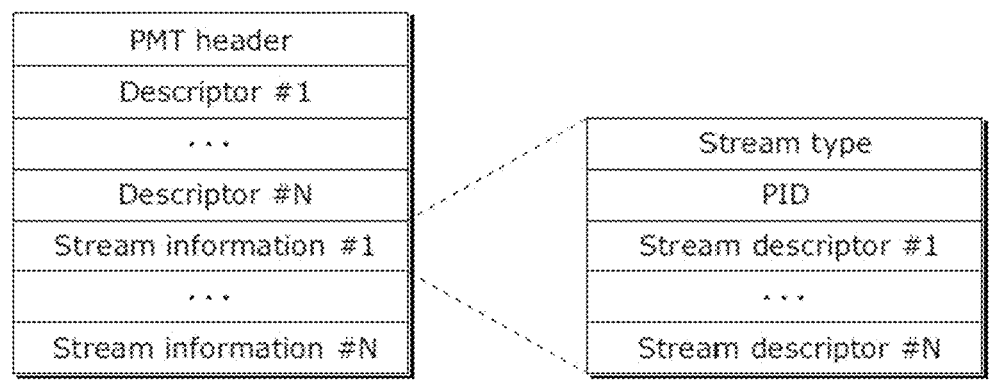
FIG. 33 shows a data structure of a PMT.

FIG. 33 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 34:
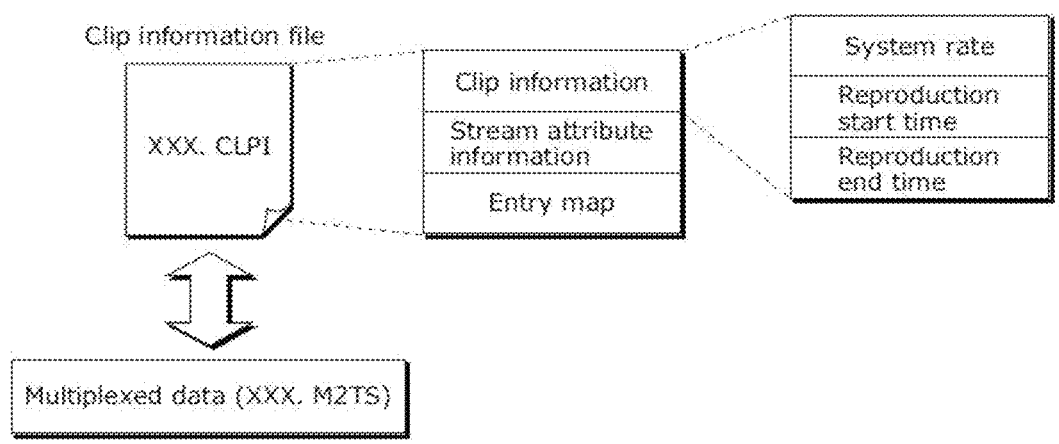
FIG. 34 shows an internal structure of multiplexed data information.

Each of the multiplexed data information files is management information of the multiplexed data as shown in FIG. 34. The multiplexed data information files are in one to one correspondence with the multiplexed data, and each of the files includes multiplexed data information, stream attribute information, and an entry map.

As illustrated in FIG. 34, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 35:
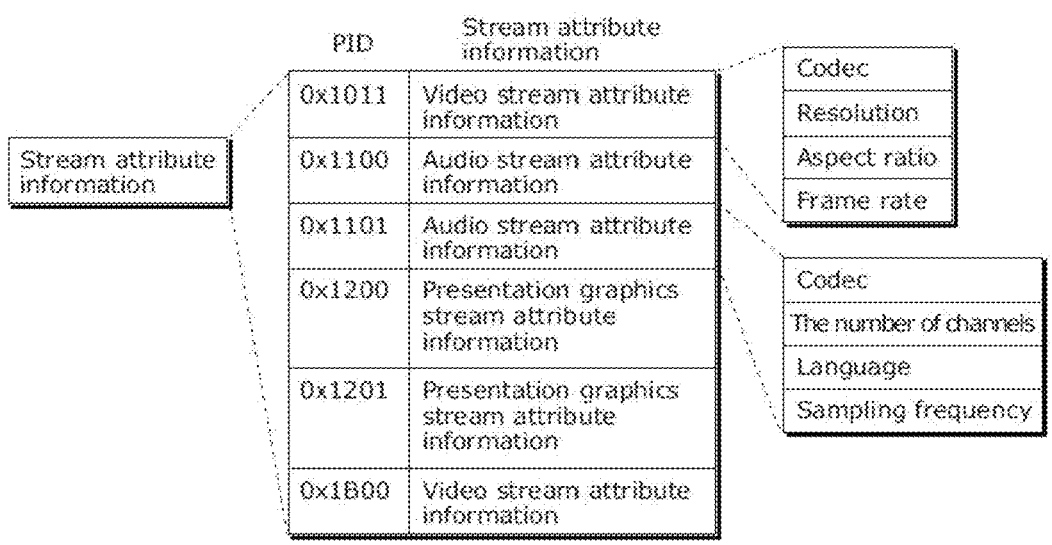
FIG. 35 shows an internal structure of stream attribute information.

As shown in FIG. 35, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 36:
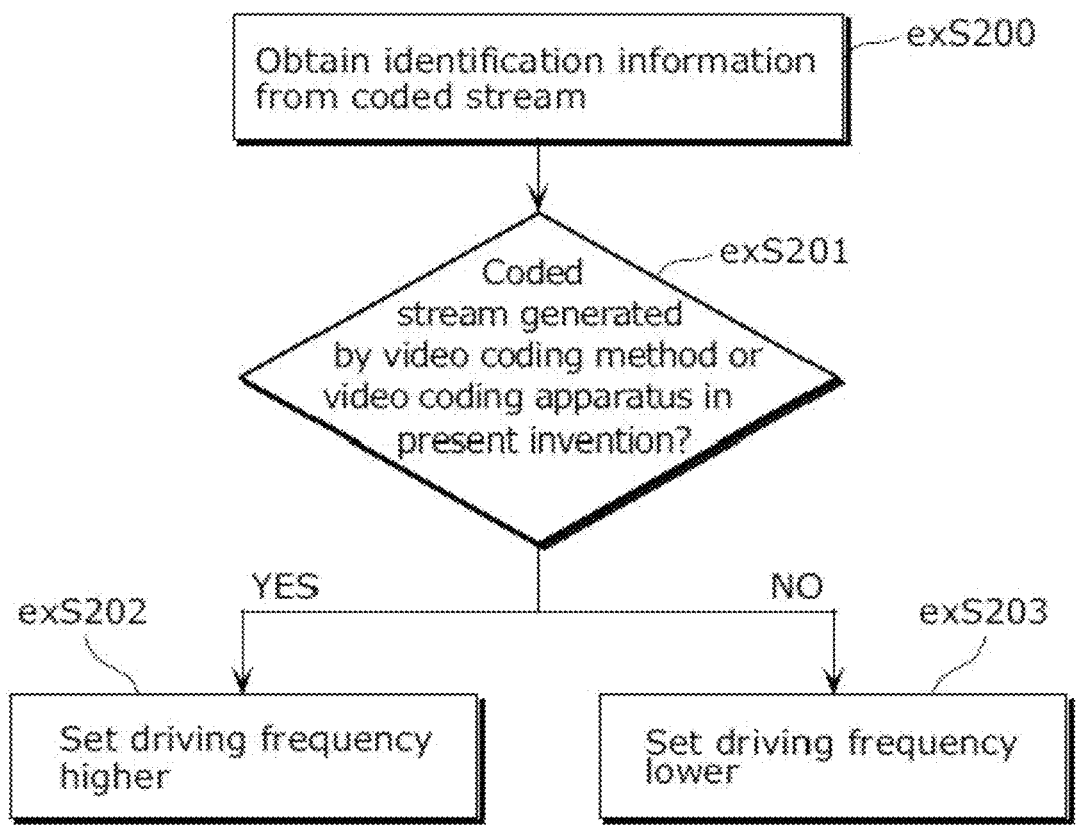
FIG. 36 shows steps for identifying video data.

Furthermore, FIG. 36 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Ninth Embodiment

Figure 37:
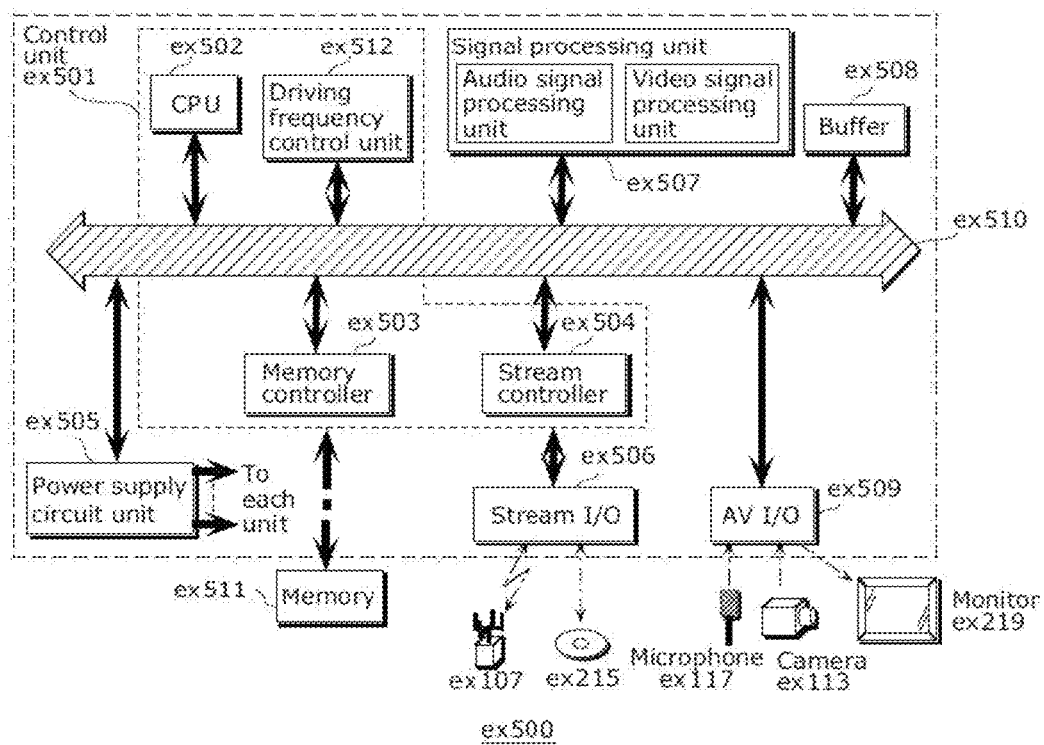
FIG. 37 shows an example of a configuration of an integrated circuit for implementing the moving picture coding method and the moving picture decoding method according to each of embodiments.

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 37 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such.

For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present disclosure is applied to biotechnology.

Tenth Embodiment

When video data generated in the moving picture coding method or by the moving picture coding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, the power consumption increases.

Figure 38:
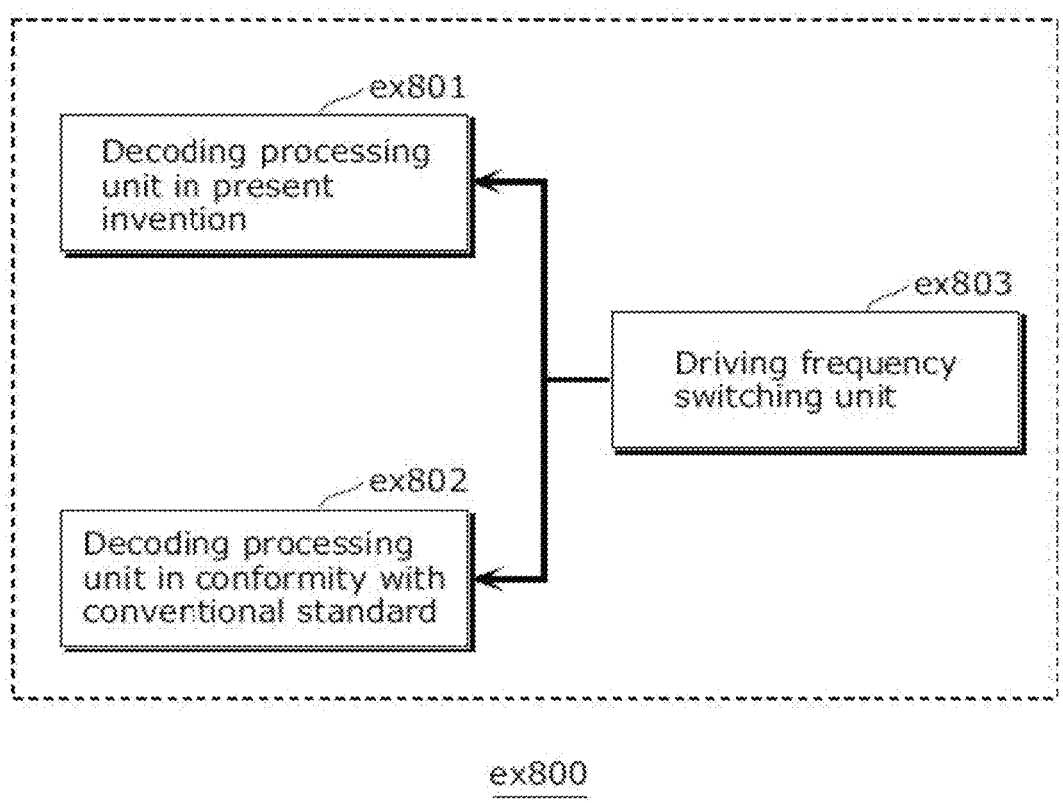
FIG. 38 shows a configuration for switching between driving frequencies.

In view of this, the moving picture decoding apparatus, such as the television ex300 and the LSI ex500 is configured to determine to which standard the video data conforms, and switch between the driving frequencies according to the determined standard. FIG. 38 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 37. Here, each of the decoding processing unit ex801 that executes the moving picture decoding method described in each of embodiments and the decoding processing unit ex802 that conforms to the conventional standard corresponds to the signal processing unit ex507 in FIG. 37. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in the eighth embodiment is probably used for identifying the video data. The identification information is not limited to the one described in the eighth embodiment but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 40. The driving frequency can be selected by storing the look-up table in the buffer ex508 and in an internal memory of an LSI, and with reference to the look-up table by the CPU ex502.

Figure 39:
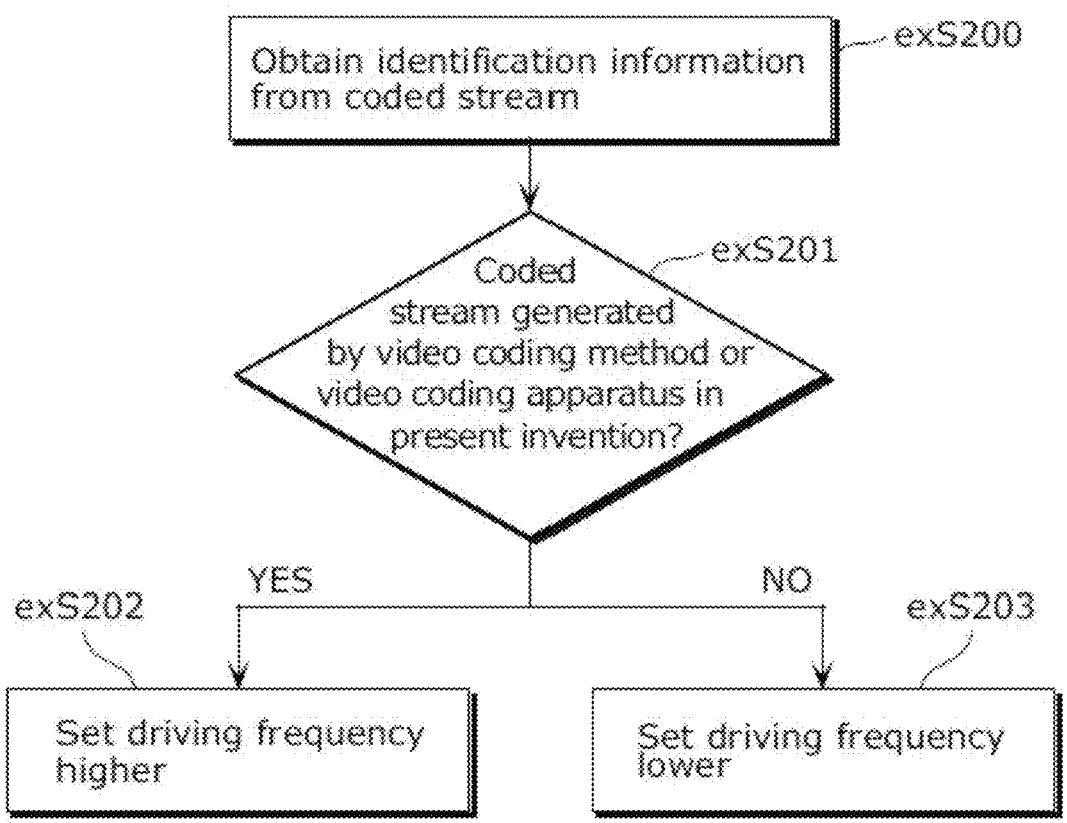
FIG. 39 shows steps for identifying video data and switching between driving frequencies.

FIG. 39 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Eleventh Embodiment

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, increase in the scale of the circuit of the LSI ex500 and increase in the cost arise with the individual use of the signal processing units ex507 that conform to the respective standards.

Figure 41A:
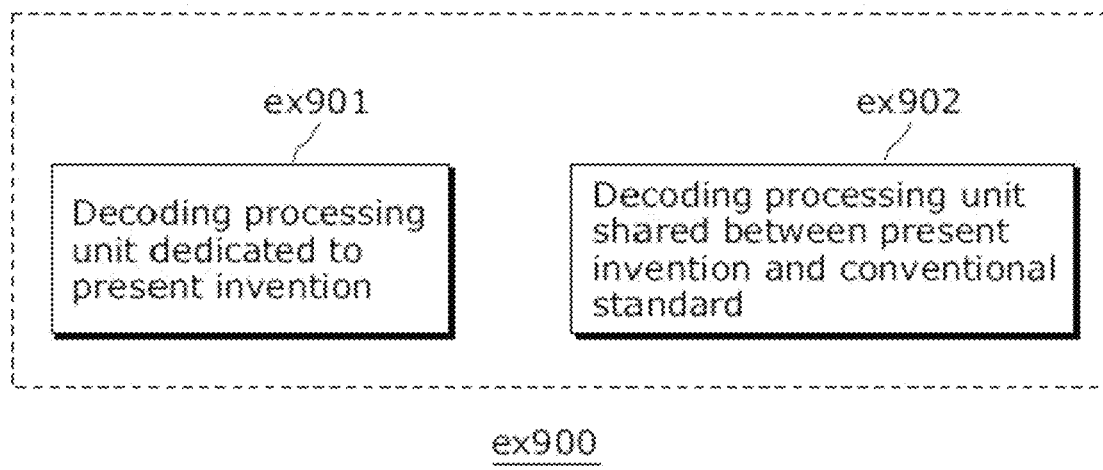
FIG. 41A is a diagram showing an example of a configuration for sharing a module of a signal processing unit.

In view of this, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 41A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing which is unique to an aspect of the present disclosure and does not conform to MPEG-4 AVC. Since the aspect of the present disclosure is characterized by motion vector prediction in particular, for example, the dedicated decoding processing unit ex901 is used for motion vector prediction. Otherwise, the decoding processing unit is probably shared for one of the inverse quantization, entropy decoding, and deblocking filtering, or all of the processing. The decoding processing unit for implementing the moving picture decoding method described in each of embodiments may be shared for the processing to be shared, and a dedicated decoding processing unit may be used for processing unique to that of MPEG-4 AVC.

Figure 41B:
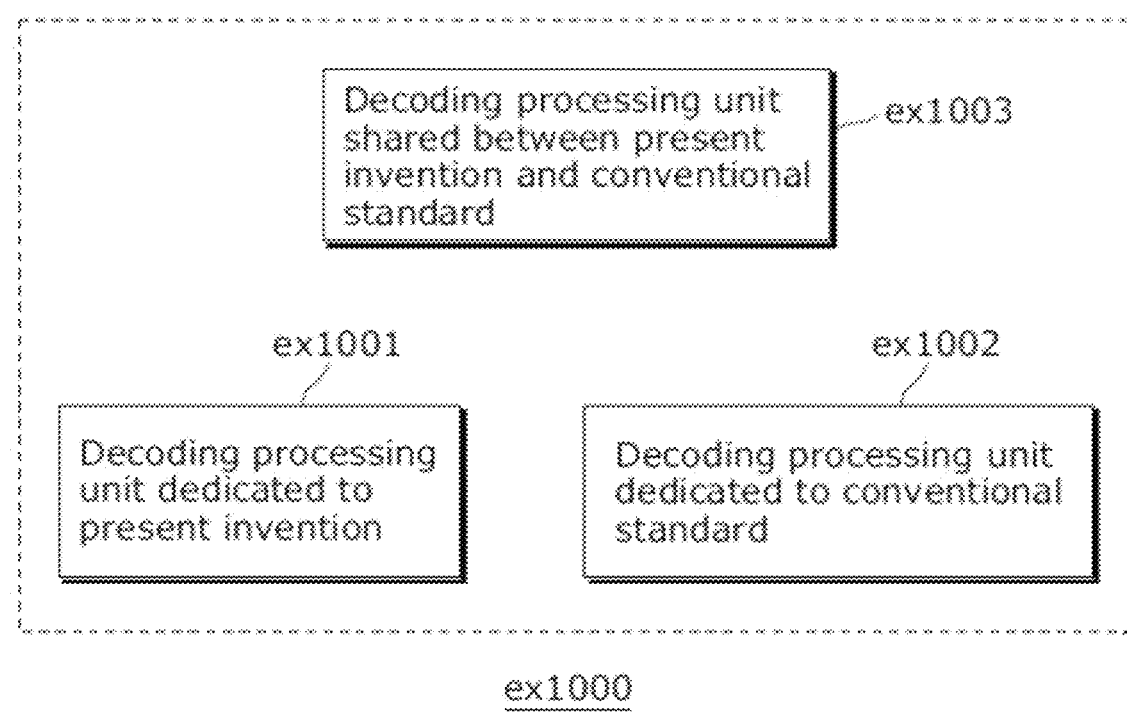
FIG. 41B is a diagram showing another example of a configuration for sharing a module of the signal processing unit.

Furthermore, ex1000 in FIG. 41B shows another example in that processing is partly shared. This example uses a configuration including a dedicated decoding processing unit ex1001 that supports the processing unique to an aspect of the present disclosure, a dedicated decoding processing unit ex1002 that supports the processing unique to another conventional standard, and a decoding processing unit ex1003 that supports processing to be shared between the moving picture decoding method according to the aspect of the present disclosure and the conventional moving picture decoding method. Here, the dedicated decoding processing units ex1001 and ex1002 are not necessarily specialized for the processing according to the aspect of the present disclosure and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present disclosure and the moving picture decoding method in conformity with the conventional standard.

It will be appreciated by the person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. An encoding method for encoding a current block of a picture to generate a bitstream, the encoding method comprising:
deriving a candidate for a motion vector predictor to encode a current motion vector of the current block, from a first motion vector of a first block which is (i) a neighboring block that is included in a current picture including the current block and is adjacent to the current block or (ii) a co-located block included in a picture identified by a flag in a slice header;
adding the derived candidate to a candidate list;
deriving at least one motion vector predictor based on a candidate selected from the candidate list;
encoding the current motion vector using the derived at least one motion vector predictor; and
encoding the current block using the current motion vector,
wherein the deriving of the candidate includes determining whether to derive the candidate from the first motion vector, based on a type of a current reference picture and a type of a first reference picture, the current reference picture being referred to from the current block using the current motion vector, and the first reference picture being referred to from the first block using the first motion vector, each of the type of the current reference picture and the type of the first reference picture is one of a long term reference picture and a short term reference picture, and in the determining, (i) the candidate is determined to be derived from the first motion vector when the type of the current reference picture and the type of the first reference picture are the same, and (ii) the candidate is derived, from the candidate list which includes one or more candidates, by using a motion vector other than the first motion vector when the type of the current reference picture and the type of the first reference picture are different.

2. An encoding apparatus for encoding a current block of a picture to generate a bitstream, the encoding apparatus comprising:

processing circuitry; and storage accessible from the processing circuitry, wherein the processing circuitry executes the steps of:

deriving a candidate for a motion vector predictor to encode a current motion vector of the current block, from a first motion vector of a first block which is (i) a neighboring block that is included in a current picture including the current block and is adjacent to the current block or (ii) a co-located block included in a picture identified by a flag in a slice header;

adding the derived candidate to a candidate list;

deriving at least one motion vector predictor based on a candidate selected from the candidate list;

encoding the current motion vector using the derived at least one motion vector predictor; and encoding the current block using the current motion vector, wherein the deriving of the candidate includes determining whether to derive the candidate from the first motion vector, based on a type of a current reference picture and a type of a first reference picture, the current reference picture being referred to from the current block using the current motion vector, and the first reference picture being referred to from the first block using the first motion vector, each of the type of the current reference picture and the type of the first reference picture is one of a long term reference picture and a short term reference picture, and in the determining, (i) the candidate is determined to be derived from the first motion vector when the type of the current reference picture and the type of the first reference picture are the same, and (ii) the candidate is derived, from the candidate list which includes one or more candidates, by using a motion vector other than the first motion vector when the type of the current reference picture and the type of the first reference picture are different.

3. An encoding apparatus for encoding a current block of a picture to generate a bitstream, the encoding apparatus comprising:

a candidate deriving unit configured to derive a candidate for a motion vector predictor to encode a current motion vector of the current block, from a first motion vector of a first block which is (i) a neighboring block that is included in a current picture including the current block and is adjacent to the current block or (ii) a co-located block included in a picture identified by a flag in a slice header;

an adding unit configured to add the derived candidate to a candidate list;

a motion vector predictor deriving unit configured to derive at least one motion vector predictor based on a candidate selected from the candidate list;

an encoding unit configured to encode the current motion vector using the derived at least one motion vector predictor, and encode the current block using the current motion vector, wherein the candidate deriving unit is configured to determine whether to derive the candidate from the first motion vector, based on a type of a current reference picture and a type of a first reference picture, the current reference picture being referred to from the current block using the current motion vector, and the first reference picture being referred to from the first block using the first motion vector, each of the type of the current reference picture and the type of the first reference picture is one of a long term reference picture and a short term reference picture, and the candidate deriving unit is configured to (i) determine that the candidate is to be derived from the first motion vector when the type of the current reference picture and the type of the first reference picture are the same, and (ii) derive the candidate, from the candidate list which includes one or more candidates, by using a motion vector other than the first motion vector when the type of the current reference picture and the type of the first reference picture are different.

* * * * *